(12) United States Patent
Minakata et al.

(10) Patent No.: US 12,521,054 B2
(45) Date of Patent: Jan. 13, 2026

(54) BIOSENSOR

(71) Applicant: Nitto Denko Corporation, Ibaraki (JP)

(72) Inventors: Masayuki Minakata, Ibaraki (JP); Ryoma Yoshioka, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 997 days.

(21) Appl. No.: 17/436,492

(22) PCT Filed: Mar. 4, 2020

(86) PCT No.: PCT/JP2020/009239
§ 371 (c)(1),
(2) Date: Sep. 3, 2021

(87) PCT Pub. No.: WO2020/184346
PCT Pub. Date: Sep. 17, 2020

(65) Prior Publication Data
US 2022/0192569 A1 Jun. 23, 2022

(30) Foreign Application Priority Data

Mar. 8, 2019 (JP) ................................ 2019-042984
Feb. 26, 2020 (JP) ................................ 2020-030104

(51) Int. Cl.
*A61B 5/257* (2021.01)
*A61B 5/00* (2006.01)

(52) U.S. Cl.
CPC ............ *A61B 5/257* (2021.01); *A61B 5/6833* (2013.01); *A61B 2562/0209* (2013.01); *A61B 2562/046* (2013.01)

(58) Field of Classification Search
CPC .................. A61B 5/257; A61B 5/6833; A61B 2562/0209; A61B 2562/046; A61B 5/268
See application file for complete search history.

(56) References Cited

U.S. PATENT DOCUMENTS 9,241,649 B2 * 1/2016 Kumar ................. A61B 5/6832
2003/0069510 A1 4/2003 Semler
(Continued)

FOREIGN PATENT DOCUMENTS

| JP | 2003-342541 A | 12/2003 |
| JP | 2004-83425 A | 3/2004 |

(Continued)

OTHER PUBLICATIONS

International Search Report issued for corresponding International Patent Application No. PCT/JP2020/009239 on May 26, 2020, along with an English translation.
(Continued)

*Primary Examiner* — Joanne M Rodden
*Assistant Examiner* — Dana Stumpfoll
(74) *Attorney, Agent, or Firm* — Hauptman Ham, LLP

(57) ABSTRACT

A biosensor according to the present invention includes a pressure-sensitive adhesive layer to be affixed to a biological surface; an electrode arranged to be capable of contacting the biological surface on a side of the pressure-sensitive adhesive layer to be affixed to the biological surface; an electronic device configured to process a biological signal obtained via the electrode; and a circuit part connecting the electrode and the electronic device, wherein the electrode has a connecting surface connected to the circuit part on a side affixed to the biological surface.

7 Claims, 10 Drawing Sheets

(56) References Cited

U.S. PATENT DOCUMENTS

| | | | |
|---|---|---|---|
| 2003/0224160 A1 | 12/2003 | Murakami et al. | |
| 2016/0302674 A1* | 10/2016 | Moyer | A61B 5/02416 |
| 2017/0333696 A1* | 11/2017 | Shibata | A61N 1/0496 |
| 2017/0360505 A1* | 12/2017 | Ehninger | A61N 1/0476 |
| 2020/0093439 A1 | 3/2020 | Yoshioka | |
| 2020/0187859 A1 | 6/2020 | Yoshioka et al. | |

FOREIGN PATENT DOCUMENTS

| | | | |
|---|---|---|---|
| JP | 2012-10978 A | 1/2012 | |
| JP | 2014-237059 A | 12/2014 | |
| JP | 2016-166436 A | 9/2016 | |
| JP | 2018102404 A * | 7/2018 | |
| JP | 2018-186958 A | 11/2018 | |
| TW | 201841590 A | 12/2018 | |
| WO | 2018/198571 A1 | 11/2018 | |
| WO | WO-2018198456 A1 * | 11/2018 | A61B 5/25 |

OTHER PUBLICATIONS

The explanation of circumstances concerning accelerated examination filed on May 20, 2020 for corresponding Japanese Patent Application No. 2020-030104, along with an English translation.

Office Acton issued for corresponding Japanese Patent Application No. 2020-030104 on Jul. 7, 2020, along with an English machine translation.

The Extended European Search Report issued on Mar. 30, 2022 for corresponding European Patent Application No. 20770517.9.

English translation of Written Opinion issued for corresponding International Patent Application No. PCT/JP2020/009239 on May 26, 2020.

Office Action dated Nov. 16, 2024 for corresponding Chinese Patent Application No. 202080018415.5, along with an English translation (10 pages).

Office Action dated Apr. 2, 2025 for corresponding Chinese Patent Application No. 202080018415.5, along with an English translation (11 pages).

Office Action issued on Feb. 20, 2024 for corresponding Chinese Patent Application No. 202080018415.5, along with an English translation (11 pages).

* cited by examiner

BIOSENSOR

CROSS REFERENCE TO RELATED APPLICATION

This application is a National Stage of International Application No. PCT/JP2020/009239, filed on Mar. 4, 2020, which designates the United States and was published in Japan, and which is based upon and claims priority to Japanese Patent Application Nos. 1) 2019-042984, filed on Mar. 8, 2019; and 2) 2020-030104, filed on Feb. 26, 2020 in the Japan Patent Office. All of the aforementioned applications are hereby incorporated by reference in their entireties.

TECHNICAL FIELD

The present invention relates to a biosensor.

BACKGROUND ART

In medical institutions such as hospitals and clinics, nursing facilities, and homes, biosensors are used for measuring biological information, for example, electrocardiograms, pulse waves, electroencephalograms, myoelectricity, or the like. A biosensor includes a bioelectrode that contacts a living body to obtain biological information of a test subject. When measuring biological information, a biosensor is affixed to a skin of a test subject to cause the bioelectrode to contact the skin of the test subject. The biological information is measured by obtaining electrical signals related to biological information through the bioelectrode.

As such a biosensor, a biocompatible polymer substrate is disclosed that includes, for example, a polymer layer having an electrode on one surface, in which as the polymer layer, a layer constituted with dimethylvinyl-terminated dimethylsiloxane (DSDT) polymerized with tetramethyltetravinylcyclotetrasiloxane (TTC) by a predetermined ratio is used (see, e.g., Patent Document 1). In the biocompatible polymer substrate, the polymer layer is affixed to a skin of a person to cause the electrodes to detect a cardiac voltage signal from the skin of the person, and a module for data obtainment receives and records cardiac voltage signals.

RELATED ART DOCUMENTS

Patent Document

Patent Document 1: Japanese Laid-Open Patent Application No. 2012-10978

SUMMARY OF THE INVENTION

Problem to be Solved by the Invention

Problem to be Solved by the Present Invention

However, the biocompatible polymer substrate of Patent Document 1 is used by having the polymer layer affixed to the skin of the test subject; therefore, in some cases, the biocompatible polymer substrate is folded in the thickness direction, or depending on motion of the skin of the test subject, the biosensor may be pulled in a direction along the surface. Therefore, in the conventional biocompatible polymer substrate, there is a likelihood that the electrode is peeled off from a living body or the polymer layer. Also, due to the electrode being peeled off from the living body or the polymer layer, there is a likelihood that the electrical conductivity is not obtained stably.

One aspect of the present invention has an object to provide a biosensor that can suppress peeling of an adhesive layer formed on one side of an electrode from a biological surface on which the electrode is placed, and simultaneously, can hold the electrical conductivity.

Means for Solving the Problem

According to one aspect of the present invention, a biosensor includes a pressure-sensitive adhesive layer to be affixed to a biological surface; an electrode arranged to be capable of contacting the biological surface on a side of the pressure-sensitive adhesive layer to be affixed to the biological surface; an electronic device configured to process a biological signal obtained via the electrode; and a circuit part connecting the electrode and the electronic device, wherein the electrode has a connecting surface connected to the circuit part on a side affixed to the biological surface.

Advantageous Effect of the Present Invention

According to one aspect of the present invention, a biosensor can suppress peeling of an adhesive layer provided on one side of an electrode from a biological surface on which the electrode is placed, and simultaneously, can hold the electrical conductivity.

EMBODIMENTS FOR CARRYING OUT THE INVENTION

Figure 1:
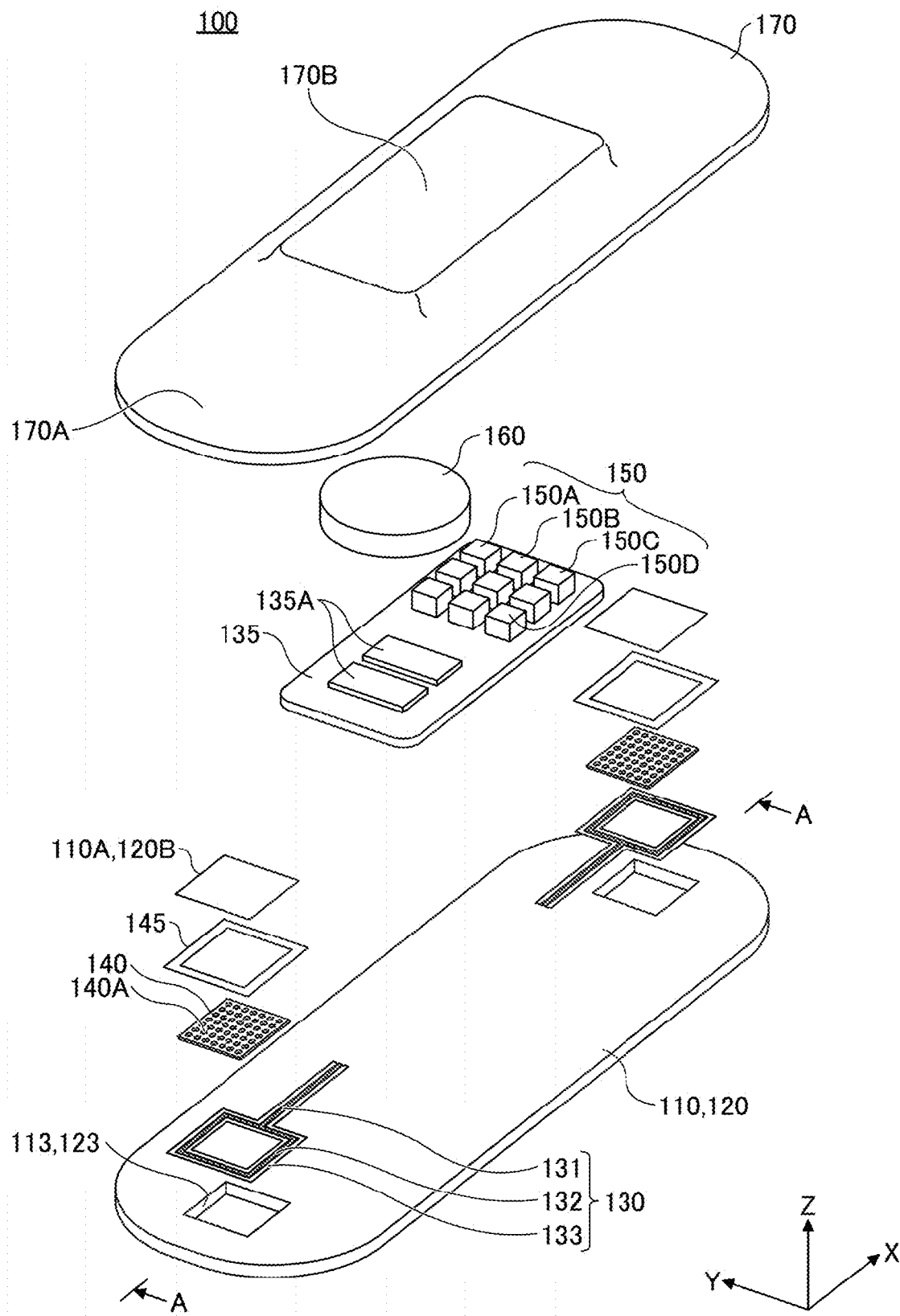
FIG. 1 is an exploded view illustrating a patch-type biosensor.

In the following, embodiments according to the present invention will be described in detail. Note that in order to make the description easier to understand, the same elements throughout the drawings are assigned the same reference codes, and duplicate descriptions are omitted. Also, the scale of a member in the drawings may differ from an actual scale. In the present description, a three-dimensional orthogonal coordinate system having triaxial directions (X axis direction, Y axis direction, and Z axis direction) is used, and it is assumed that coordinates in a principal surface of an electrode are taken in the X axis direction and in the Y axis direction, and the height direction (thickness direction) corresponds to the Z axis direction. A direction from the bottom to the top of an electrode is referred to as the +Z axis direction and the opposite direction is referred to as the −Z axis direction. In the following description, for the sake of convenience of description, the +Z axis direction will be referred to as the upper side or the top, and the −Z axis direction will be referred to as the lower side or the bottom; however, these do not represent a universal vertical relationship. In the present specification, a tilde "~" indicating a numerical range is meant to include a lower limit and an upper limit that are given as numerical values before and after the tilde, unless otherwise noted.

<Biosensor>

A biosensor according to an embodiment will be described. In the present embodiment, as an example, a case will be described in which a patch-type biosensor is affixed to a living body to measure biometric information. Note that the living body here may include a human body (a person) and animals such as cattle, horses, pigs, chickens, dogs, cats, and the like. The biosensor is affixed to part of the living body (e.g., skin, scalp, forehead, etc.). The biosensor can be suitably used for living bodies, in particular for human bodies.

Figure 2:
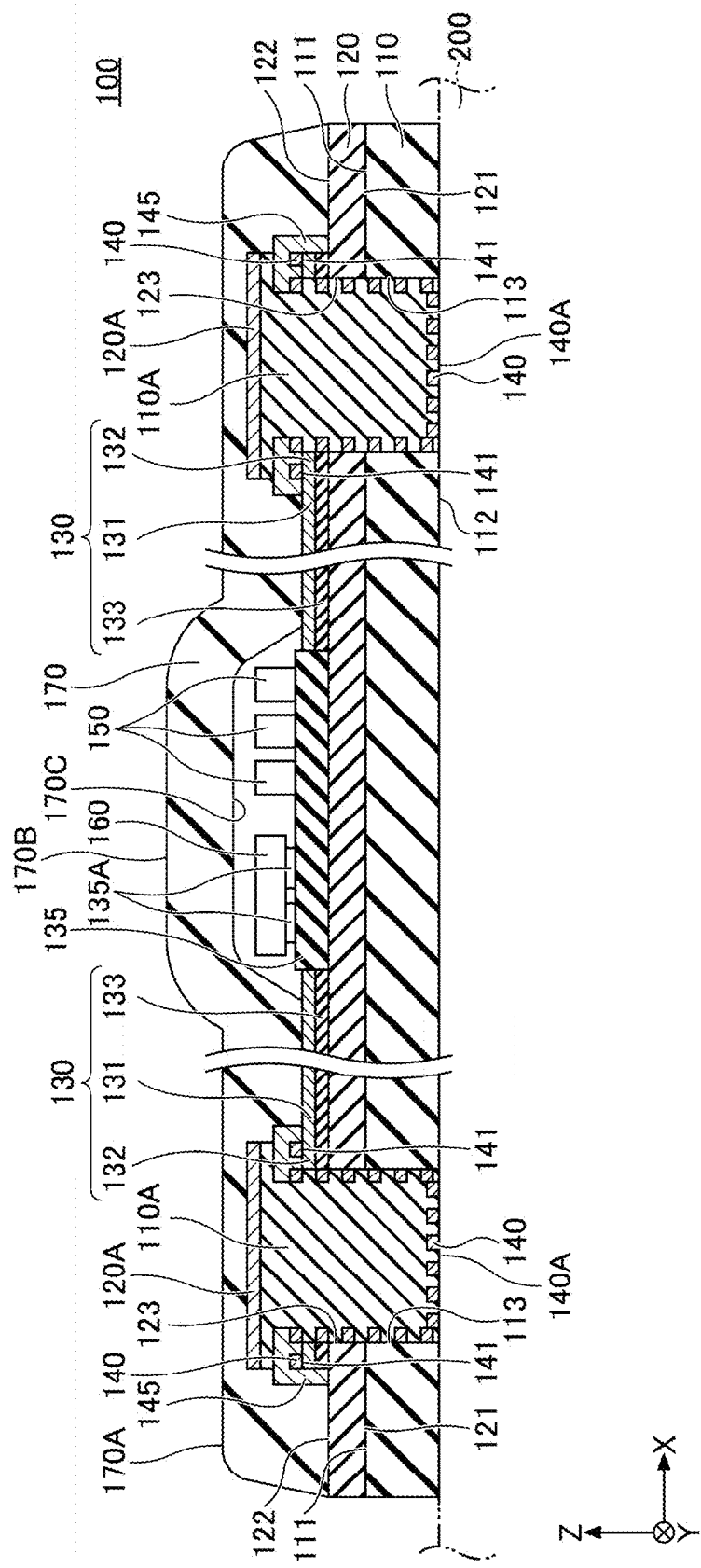
FIG. 2 is a diagram illustrating a cross section in a completed state corresponding to a cross section viewed in the direction of arrows A-A in FIG. 1.

FIG. 1 is an exploded view illustrating a patch-type biosensor 100 according to an embodiment. FIG. 2 is a diagram illustrating a cross section in a completed state corresponding to a cross section viewed in the direction of arrows A-A in FIG. 1. As illustrated in FIGS. 1 and 2, the patch-type biosensor 100 according to an embodiment includes a pressure-sensitive adhesive layer 110, a base material layer 120, circuit parts 130, a substrate 135, probes 140, fixing tapes 145, an electronic device 150, a battery 160, and a cover 170, as major components. In the following, the respective members constituting the patch-type biosensor 100 will be described.

The patch-type biosensor 100 is a sheet-like member having a generally elliptic shape in plan view. The patch-type biosensor 100 is covered with the cover 170 on the top surface opposite to the bottom surface (a surface on the −Z direction side) that is to be affixed to a skin 200 of a living body. The bottom surface of the patch-type biosensor 100 is the affixing surface.

The circuit part 130 and the substrate 135 are mounted on the top surface of the base material layer 120. Also, the probe 140 is provided in a state of being embedded in a pressure-sensitive adhesive layer 110A so as to be exposed from a bottom surface 112 of the pressure-sensitive adhesive layer 110. The bottom surface 112 is the affixing surface of the patch-type biosensor 100.

The pressure-sensitive adhesive layer 110 is a flat plate-shaped adhesive layer. The pressure-sensitive adhesive layer 110 is oriented to have its longitudinal direction extend in the X axis direction and its short direction extend in the Y axis direction. The pressure-sensitive adhesive layer 110 is supported by the base material layer 120, and is affixed to a bottom surface 121 of the base material layer 120.

As illustrated in FIG. 2, the pressure-sensitive adhesive layer 110 has a top surface 111 and a bottom surface 112. The top surface 111 and the bottom surface 112 are flat surfaces. The pressure-sensitive adhesive layer 110 is a layer with which the patch-type biosensor 100 contacts the living body. The bottom surface 112 has pressure-sensitive adhesiveness, and hence, can be affixed to the skin 200 of the living body. The bottom surface 112 is the bottom surface of the patch-type biosensor 100, and can be affixed to a biological surface such as the skin 200.

The material of the pressure-sensitive adhesive layer 110 is not limited in particular as long as being a material having pressure-sensitive adhesiveness, and a material having biocompatibility or the like may be enumerated. As the material of the pressure-sensitive adhesive layer 110, an acryl-based pressure-sensitive adhesive, silicone-based pressure-sensitive adhesive, or the like may be enumerated. Favorably, an acryl-based pressure-sensitive adhesive may be recommended.

The acryl-based pressure-sensitive adhesive contains an acrylic polymer as the main component.

The acrylic polymer is a pressure-sensitive adhesive component. As the acrylic polymer, a polymer polymerized with a monomer component that contains (meth)acrylic ester such as isononyl acrylate, methoxyethyl acrylate, or the like as the main component, and contains a monomer copolymerizable with (meth)acrylic ester such as acrylic acid or the like as an optional component, can be used. The content of the main component among the monomer components is 70 mass % to 99 mass %, and the content of the optional component among the monomer components is 1 mass % to 30 mass %. As the acrylic polymer, for example, a (meth) acrylic ester-based polymer described in Japanese Laid-Open Patent Application No. 2003-342541, or the like can be used.

Favorably, the acryl-based pressure-sensitive adhesive further contains carboxylic acid ester.

The carboxylic acid ester contained in the acryl-based pressure-sensitive adhesive is a pressure-sensitive adhesiveness modifier that reduces the pressure-sensitive adhesiveness of the acrylic polymer, to modify the pressure-sensitive adhesiveness of the pressure-sensitive adhesive layer 110. The carboxylic acid ester is a carboxylic acid ester compatible with an acrylic polymer.

Specifically, the carboxylic acid ester is tri-fatty acid glyceryl, as an example.

The content of carboxylic acid ester is, with respect to 100 parts by mass of the acrylic polymer, favorably 30 parts by mass to 100 parts by mass, and more favorably 50 parts by mass to 70 parts by mass.

The acryl-based pressure-sensitive adhesive may contain a crosslinking agent as necessary. The crosslinking agent is a crosslinking component that crosslinks the acrylic polymer. As the crosslinking agent, a polyisocyanate compound, epoxy compound, melamine compound, peroxide compound, urea compound, metal alkoxide compound, metal chelate compound, metal salt compound, carbodiimide compound, oxazoline compound, aziridine compound, or amine compound, or the like may be enumerated. Any of these crosslinking agents may be used alone, or two or more may be used in combination. As the crosslinking agent, favorably, a polyisocyanate compound (polyfunctional isocyanate compound) may be recommended.

The content of crosslinking agent is, with respect to 100 parts by mass of the acrylic polymer, for example, favorably 0.001 parts by mass to 10 parts by mass, and more favorably 0.01 parts by mass to 1 part by mass.

It is favorable that the pressure-sensitive adhesive layer 110 has an excellent biocompatibility. For example, when the pressure-sensitive adhesive layer 110 undergoes a keratin peeling test, the ratio of keratin-peeled area is favorably 0% to 50%, and more favorably 1% to 15%. As long as the ratio of keratin-peeled area is within a range of 0% to 50%, the load imposed on the skin 200 (see FIG. 2) can be suppressed even if the pressure-sensitive adhesive layer 110 is affixed to the skin 200 (see FIG. 27). Note that the keratin peeling test is measured by a method described in Japanese Laid-Open Patent Application No. 2004-83425.

The moisture permeability of the pressure-sensitive adhesive layer 110 is favorably greater than or equal to 300 g/m$^2$/day, more favorably greater than or equal to 600 g/m$^2$/day, and even more favorably greater than or equal to 1,000 g/m$^2$/day. As long as the moisture permeability of the pressure-sensitive adhesive layer 110 is greater than or equal to 300 g/m$^2$/day, the load imposed on the skin 200 (see FIG. 2) can be suppressed even if the pressure-sensitive adhesive layer 110 is affixed to the skin 200 (see FIG. 2) of the living body.

The pressure-sensitive adhesive layer 110 comes to have biocompatibility by satisfying at least one of the following requirements: the ratio of keratin-peeled area in the keratin peeling test is less than or equal to 50%; and the moisture permeability is greater than or equal to 300 g/m$^2$/day. It is more favorable that the material of the pressure-sensitive adhesive layer 110 satisfies both of the requirements described above. This enables the pressure-sensitive adhesive layer 110 to have a higher biocompatibility more stably.

The thickness between the top surface 111 and bottom surface 112 of the pressure-sensitive adhesive layer 110 is favorably 10 μm to 300 μm. If the thickness of the pressure-sensitive adhesive layer 110 is within a range of 10 μm to 95 μm, the patch-type biosensor 100 can be made thinner, especially in a region other than the electronic device 150 in the patch-type biosensor 100.

The base material layer 120 is a support layer that supports the pressure-sensitive adhesive layer 110, and the pressure-sensitive adhesive layer 110 is bonded to the bottom surface 121 of the base material layer 120. The circuit part 130 and the substrate 135 are arranged on the top surface of the base material layer 120.

The base material layer 120 is a flat plate-shaped (sheet-like) member made of an insulator. The shape of the base material layer 120 in plan view is the same as the shape of the pressure-sensitive adhesive layer 110 in plan view, and these are stacked at aligned positions in plan view.

The base material layer 120 has the bottom surface 121 and a top surface 122. The bottom surface 121 and the top surface 122 are flat surfaces. The bottom surface 121 contacts the top surface 111 of the pressure-sensitive adhesive layer 110 (by pressure-sensitive bonding). The base material layer 120 simply needs to be made of a flexible resin having moderate elasticity, flexibility, and toughness, and may be made of a thermoplastic resin, for example, a polyurethane-based resin, silicone-based resin, acryl-based resin, polystyrene-based resin, vinyl chloride-based resin, polyester-based resin, and the like.

The thickness of the base material layer 120 is favorably within a range of 1 μm to 300 μm, more favorably within a range of 5 μm to 100 μm, and even more favorably within a range of 10 μm to 50 μm.

The circuit part 130 includes a wire 131, a frame 132, and a substrate 133, to connect the probe 140 to the electronic device 150. The patch-type biosensor 100 includes two instances of such a circuit part 130. The wire 131 and the frame 132 are provided on the top surface of the substrate 133, and formed integrally. The wire 131 connects the frame 132 to the electronic device 150 and the battery 160. Also, the circuit part 130 is connected to the probe 140 on a side (in the +Z axis direction) opposite to the side affixed to the surface of the skin 200. Part of the circuit part 130 connected to the probe 140 is arranged on a side (in the +Z axis direction) opposite to the side of the probe 140 affixed to the surface of the skin 200.

The wire 131 and the frame 132 can be made of copper, nickel, gold, an alloy of these, or the like. The thickness of the wire 131 and the frame 132 is favorably within a range of 0.1 μm to 100 μm, more favorably within a range of 1 μm to 50 μm, and even more favorably within a range of 5 μm to 30 μm.

Each of the two instances of the circuit part 130 is provided corresponding to two through holes 113 and 123 of the pressure-sensitive adhesive layer 110 and of the base material layer 120, respectively. The wire 131 is connected to the electronic device 150 and a terminal 135A for the battery 160 via wires of the substrate 135. The frame 132 is a rectangular loop-shaped conductive member larger than the opening of the through hole 123 of the base material layer 120.

The substrate 133 has a shape substantially the same as that of the wire 131 and the frame 132 in plan view. Part of the substrate 133 on which the frame 132 is provided has a rectangular loop shape larger than the opening of the through hole 123 of the base material layer 120. The frame 132 and the rectangular loop-shaped part of the substrate 133 on which the frame 132 is provided, are provided to surround the through hole 123 on the top surface of the base material layer 120. The substrate 133 simply needs to be formed of an insulator material, and for example, a substrate or film formed of polyimide or the like can be used. The base material layer 120 has tackiness; therefore, the substrate 133 is fixed to the top surface of the base material layer 120.

The substrate 135 is a substrate formed of an insulator material, to have the electronic device 150 and the battery 160 mounted, and provided on the top surface 122 of the base material layer 120. The substrate 135 is fixed by the tackiness of the base material layer. As the substrate 135, a substrate or film formed of polyimide or the like can be used, as an example. On the top surface of the substrate 135, wires and the terminal 135A for the battery 160 are provided. The wires of the substrate 135 are connected to the electronic device 150 and the terminal 135A, and to the wire 131 of the circuit part 130.

The probe 140 is provided in a state of being pushed into the inner walls of the through holes 113 and 123 by the pressure-sensitive adhesive layer 110A, from the top surface of the base material layer 120 (a surface on the +Z-axis direction side) around the through hole 123, along the inner walls of the through holes 113 and 123. As described above, the probe 140 is provided in a state of being embedded in the pressure-sensitive adhesive layer 110A so as to be exposed from the bottom surface 112 of the pressure-sensitive adhesive layer 110, and arranged on a side of the pressure-sensitive adhesive layer 110 (in the -Z axis direction) so as to be capable of contacting the surface of the skin 200. The probe 140 has exposed regions from which part of the probe 140 is exposed, on the side of the pressure-sensitive adhesive layer 110 (in the -Z axis direction) to be affixed to the skin 200. When the pressure-sensitive adhesive layer 110 is affixed to the skin 200, the probe 140 contacts the skin 200 to detect biological signals. The biological signal is, for example, an electrical signal representing an electrocardiographic waveform, electroencephalogram, pulse, or the like.

The probe 140 has a connecting surface 141 connected to the frame 132 of the circuit part 130 on the side (in the -Z axis direction) to be affixed to the biological surface, on the top surface (a surface in the +Z axis direction) of the frame 132 of the circuit part 130 positioned around the through hole 123 of the base material layer 120. Note that the connecting surface 141 may be connected to both the wire 131 and the frame 132.

The probe 140 is formed to have a rectangular shape in plan view, and has holes 140A arranged in a matrix that is larger than the respective through holes 113 and 123 of the pressure-sensitive adhesive layer 110 and of the base material layer 120. At the ends (end parts of four sides) in the X direction and the Y direction of the probe 140, the ladder-like sides of the probe 140 may protrude.

The probe 140 may have the holes 140A over the entirety of its principal surface, and favorably has the holes 140A in the connecting surface 141. By having the holes 140A provided over the entirety or around the edges of its principal surface, the probe 140 can have the holes 140A formed in the connecting surface 141. By having the holes 140A provided in the connecting surface 141, the pressure-sensitive adhesive layer 110A can be exposed from the holes 140A formed in the connecting surface 141; therefore, the pressure-sensitive adhesive layer 110A can be easily come into contact with the top surface (the surface in the +Z axis direction) of the frame 132 of the circuit part 130.

The probe 140 is formed using an electrode. The electrode will be described with reference to FIGS. 3 and 4. Note that in FIGS. 3 and 4, the electrode corresponds to the probe 140 illustrated in FIGS. 1 and 2, and holes in the electrode correspond to the holes 140A illustrated in FIGS. 1 and 2.

(Electrode)

Figure 3:
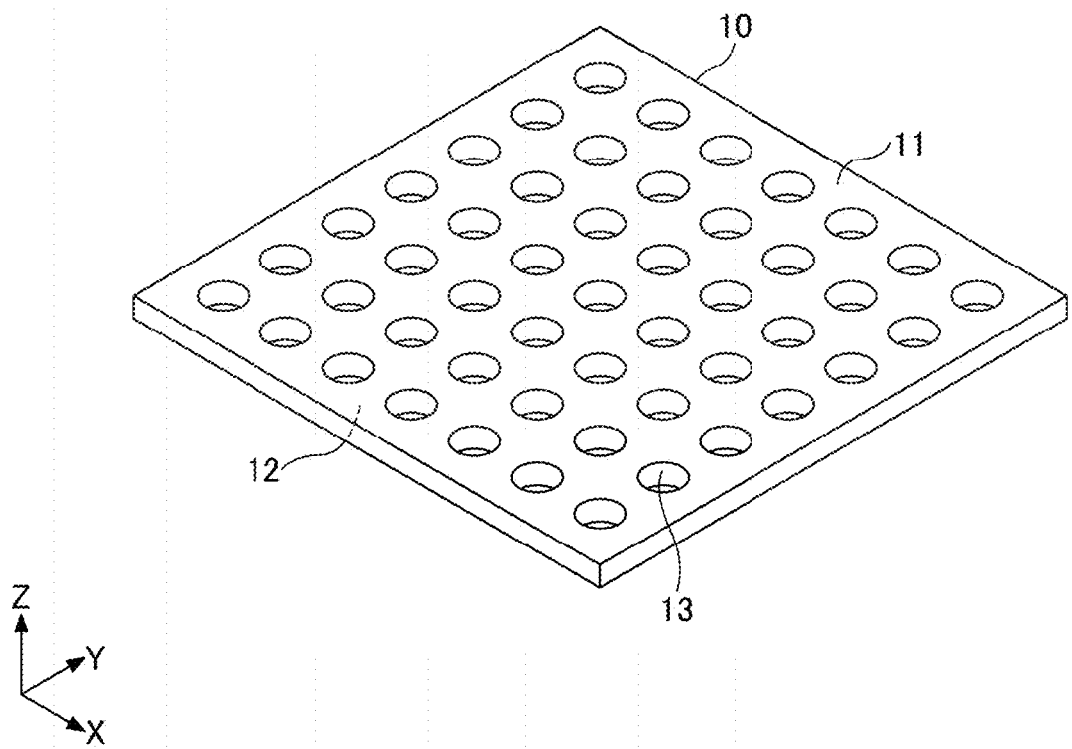
FIG. 3 is a perspective view of an electrode according to an embodiment.

FIG. 3 is a perspective view of the electrode. As illustrated in FIG. 3, the electrode 10 is a plate-shaped (sheet-like) member having a pair of principal surfaces 11 and 12 parallel to each other, and has multiple holes 13 penetrating through the electrode 10 in the thickness direction (the Z axis direction), formed in a lattice pattern.

The principal surfaces 11 and 12 are flat surfaces. The principal surface 11 is a principal surface on one side (in the +Z axis direction) of the electrode 10, and serves as the top surface of the electrode 10. The principal surface 12 is a principal surface positioned in the direction opposite to the principal surface 11 (in the −Z axis direction), and serves as the bottom surface of the electrode 10. The principal surfaces 11 and 12 are formed to have a rectangular shape in plan view. Note that in the present embodiment, a rectangular shape means a rectangle, a square, or a rectangle or square having its corners chamfered.

The electrode 10 favorably has a size of 5 mm to 50 mm in plan view.

The electrode 10 favorably has a thickness of 0.1 μm to 100 μm. As long as the thickness of the electrode 10 is within a range 0.1 μm to 100 μm, the electrode 10 can have strength and easy handleability.

The multiple holes 13 are arranged in a square lattice pattern on the principal surface 11, and are arrayed in the principal surface 11 with approximately equal intervals and in parallel with two crossing axial directions (the X axis direction and the Y axis direction). The holes 13 are all formed to have substantially the same size and shape. Note that the multiple holes 13 may not be equally spaced.

Figure 4:
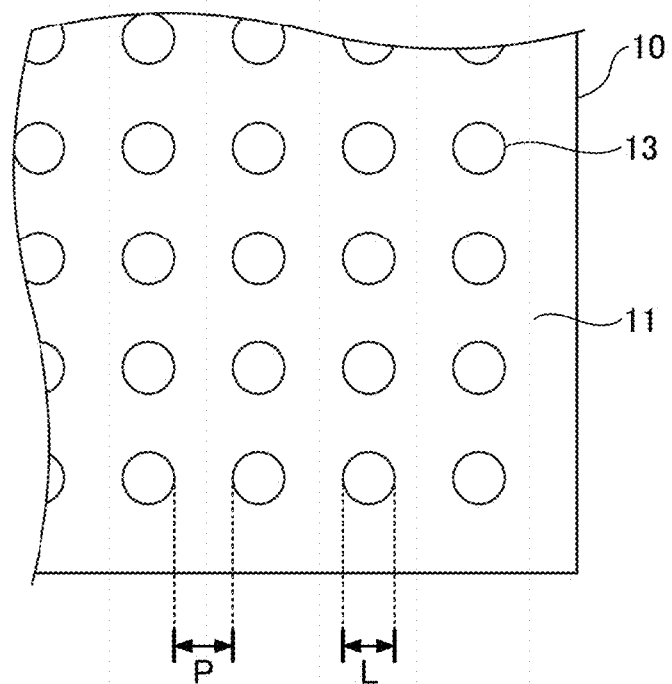
FIG. 4 is a partially enlarged plan view of an electrode.

As illustrated in FIG. 4, each of the holes 13 is formed to have a circular shape in plan view. The diameter L of the hole 13 can be designed appropriately depending on the size of the principal surface 11 and the like, and is favorably 100 nm to 10 mm, more favorably 300 nm to 5 mm, and even more favorably 600 μm to 2 mm. Note that the shape of the hole 13 may be elliptic. In the case where the shape of the hole 13 is elliptic, it is favorable that the major axis of the hole 13 has a value of L as described above.

Although depending on the shape and size of the holes 13, the distance P between the holes 13 is favorably 100 nm to 10 mm, more favorably 300 nm to 5 mm, and even more favorably 600 nm to 2 mm. Note that the distance P between the holes 13 means a shortest distance between adjacent holes 13. The hole 13 is formed to have a circular shape in plan view; therefore, the distance between the holes 13 means the distance between the closest points of the adjacent holes 13.

The opening ratio of the holes 13 is 2% to 80%, favorably 10% to 70%, and more favorably 30% to 60%. If the opening ratio of the holes 13 is less than 2%, the area of the adhesive layer exposed from the holes 13 of the electrode 10 is small when the adhesive layer is formed on the electrode 10. Therefore, when the electrode 10 together with the adhesive layer is peeled off from the bonding surface, the peeling adhesive strength of the adhesive layer with respect to the bonding surface becomes too small. If the opening ratio of the holes 13 exceeds 80%, the area of the adhesive layer exposed from the holes 13 in the electrode 10 becomes too large. Therefore, when the electrode 10 together with the adhesive layer is peeled off from the bonding surface, the adhesive strength becomes too strong.

Note that the opening ratio is a ratio of the sum of the areas of holes 13 to the total area of the principal surface (the principal surface 11 or the principal surface 12) of the electrode 10 including the areas of the holes 13, and is expressed by the following formula (1):

Opening ratio (%)=(the sum ($cm^2$) of the areas of the holes 13)/(the total area ($cm^2$) of the entire principal surface (the principal surface 11 or the principal surface 12) of the electrode 10 including the areas of the holes 13)×100     (1)

The number of holes 13 is favorably less than or equal to 2,000 holes/$cm^2$, more favorably less than or equal to 1,000 holes/$cm^2$, and even more favorably less than or equal to 500 holes/$cm^2$. As long as the number of holes 13 is less than or equal to 2,000 holes/$cm^2$, when the adhesive layer is formed on the electrode 10, a sufficient number of regions of the adhesive layer exposed from the holes 13 of the electrode 10 can be secured, and it becomes easier to maintain the electrical conductivity. The lower limit of the number of holes 13 is two, and may be greater.

The electrode 10 can be formed using a conductive composition containing a conductive polymer and a binder resin.

As the conductive polymer, for example, polythiophene, polyacetylene, polypyrrole, polyaniline, polyphenylene vinylene, or the like can be used. Any of these may be used alone, or two or more may be used in combination. Among these, it is favorable to use a polythiophene compound. From the viewpoints of having a lower contact impedance with a living body and high electrical conductivity, it is more favorable to use PEDOT/PSS doped with polystyrenesulfonic acid (poly4-styrenesulfonate; PSS) in poly3,4-ethylenedioxythiophene (PEDOT).

The content of the conductive polymer is, with respect to 100 parts by mass of the conductive composition, favorably 0.20 to 20 parts by mass, more favorably 2.5 to 15 parts by mass, and even more favorably 3.0 to 12 parts by mass. As long as the content is, with respect to the conductive composition, within a range of 0.20 parts by mass to 20 parts by mass, excellent electrical conductivity, toughness, and flexibility can be imparted to the conductive composition.

The conductive polymer may be used as an aqueous solution dissolved in a solvent. In this case, as the solvent, an organic solvent or an aqueous solvent can be used. As the organic solvent, for example, ketones such as acetone, methyl ethyl ketone (MEK), or the like; ester such as ethyl acetate; ethers such as propylene glycol monomethyl ether or the like; amides such as N, N-dimethylformamide, or the like, may be enumerated. As the aqueous solvent, for example, water; alcohol such as methanol, ethanol, propanol, isopropanol, or the like, may be enumerated. Among these, it is favorable to use an aqueous solvent.

As the binder resin, a water-soluble polymer, a water-insoluble polymer, or the like can be used. As the binder resin, it is favorable to use a water-soluble polymer from the viewpoint of compatibility with other components contained in the conductive composition. Note that the water-soluble polymer includes a hydrophilic polymer that is hydrophilic though not completely soluble in water.

As the water-soluble polymer, a hydroxyl group-containing polymer or the like can be used. As the hydroxyl group-containing polymer, sugars such as agarose or the like, polyvinyl alcohol (PVA), modified polyvinyl alcohol, a copolymer of acrylic acid and sodium acrylate, or the like can be used. Any of these may be used alone, or two or more may be used in combination. Among these, polyvinyl alcohol or modified polyvinyl alcohol is favorable, and modified polyvinyl alcohol is more favorable.

As the modified polyvinyl alcohol, acetoacetyl group-containing polyvinyl alcohol, diacetone acrylamide modified polyvinyl alcohol, or the like may be enumerated. Note that as the diacetone acrylamide modified polyvinyl alcohol, for example, a diacetone acrylamide modified polyvinyl alcohol-based resin (DA modified PVA-based resin) described in Japanese Laid-Open Patent Application No. 2016-166436 can be used.

The content of the binder resin is, with respect to 100 parts by mass of the conductive composition, favorably 5 to 140 parts by mass, more favorably 10 to 100 parts by mass, and even more favorably 20 to 70 parts by mass. As long as the content is within a range of 5 parts by mass to 140 parts by mass with respect to the conductive composition, excellent electrical conductivity, toughness, and flexibility can be imparted to the conductive composition.

The binder resin may be used as an aqueous solution dissolved in a solvent. As the solvent, a similar solvent can be used as in the case of the conductive polymer described above.

It is favorable that the conductive composition further contain at least one of a crosslinking agent and a plasticizing agent. The crosslinking agent and the plasticizing agent have a function of giving toughness and flexibility to the conductive composition.

Note that the toughness is a property that makes excellent strength and elongation compatible with each other. The toughness does not include a property in which either one of the strength or elongation is remarkably excellent whereas the other is remarkably inferior, but includes a property in which both are balanced.

The flexibility is a property in that after having bent the electrode 10 obtained as a cured material of the conductive composition, occurrence of damage such as fracture in the bent part can be suppressed.

The crosslinking agent crosslinks the binder resin. By having the crosslinking agent contained in the binder resin, the toughness of the conductive composition can be improved. It is favorable that the crosslinking agent has reactivity with a hydroxyl group. If the crosslinking agent has reactivity with a hydroxyl group, in the case where the binder resin is a hydroxyl group-containing polymer, the crosslinking agent can react with hydroxyl groups of a hydroxyl group-containing polymer.

As the crosslinking agent, a zirconium compound such as zirconium salt; a titanium compound such as titanium salt; a borate such as boric acid; an isocyanate compound such as blocked isocyanate; an aldehyde compound such as dialdehyde such as glyoxal; an alkoxyl group-containing compound, a methylol group-containing compound, or the like may be enumerated. Any of these may be used alone, or two or more may be used in combination. Among these, a zirconium compound, isocyanate compound, or aldehyde compound is favorable from the viewpoint of the reactivity and the safety.

The content of the crosslinking agent is, with respect to 100 parts by mass of the conductive composition, favorably 0.2 to 80 parts by mass, more favorably 1 to 40 parts by mass, and even more favorably 3.0 to 20 parts by mass. As long as the content is, with respect to 100 parts by mass of the conductive composition, within a range of 0.2 parts by mass to 80 parts by mass, excellent toughness and flexibility can be imparted to the conductive composition.

The crosslinking agent may be used as an aqueous solution dissolved in a solvent. As the solvent, a similar solvent can be used as in the case of the conductive polymer described above.

The plasticizing agent improves the tensile elongation and the flexibility of the conductive composition. As the plasticizing agent, glycerin, ethylene glycol, propylene glycol, sorbitol, a polyol compound of these polymers or the like, N-methylpyrrolidone (NMP), an aprotonic compound such as dimethyl formaldehyde (DMF), N—N'-dimethylacetamide (DMAC), dimethyl sulfoxide (DMSO), or the like may be enumerated. Any of these may be used alone, or two or more may be used in combination. Among these, glycerin is favorable from the viewpoint of compatibility with the other components.

The content of the plasticizing agent is, with respect to 100 parts by mass of the conductive composition, favorably 0.2 parts by mass to 150 parts by mass, more favorably 1.0 parts by mass to 90 parts by mass, and even more favorably 10 parts by mass to 70 parts by mass. As long as the content is, with respect to 100 parts by mass of the conductive composition, within a range of 0.2 parts by mass to 150 parts by mass, excellent toughness and flexibility can be imparted to the conductive composition.

As for the crosslinking agent and the plasticizing agent, at least one of these may be contained in the conductive composition. By having at least one of the crosslinking agent and the plasticizing agent contained in the conductive composition, the electrode 10 can be improved in terms of the toughness and the flexibility.

In the case where the crosslinking agent is contained in the conductive composition, but the plasticizing agent is not contained, the electrode 10 can be improved in terms of both the tensile strength and the tensile elongation, and improved in terms of the flexibility.

In the case where the plasticizing agent is contained in the conductive composition, but the crosslinking agent is not contained, the electrode 10 can be improved in terms of the tensile elongation; therefore, as a whole, the electrode 10 can be improved in terms of the toughness. Also, the flexibility of the electrode 10 can be improved.

It is favorable that both the crosslinking agent and the plasticizing agent are contained in the conductive composition. By having both the crosslinking agent and the plasticizing agent contained in the conductive composition, more outstanding toughness can be imparted to the electrode 10.

In addition to the above components, the conductive composition may optionally contain a variety of publicly known additives such as a surfactant, a softening agent, a stabilizer, a leveling agent, an antioxidant, an anti-hydrolysis agent, a swelling agent, a thickener, a colorant, a bulking agent, and the like, by appropriate ratios, as necessary. As the surfactant, a silicone-based surfactant and the like may be enumerated.

The conductive composition is prepared by mixing the components described above by the ratios as described above.

The conductive composition may optionally contain a solvent by an appropriate ratio, as necessary. In this way, an aqueous solution of the conductive composition (the aqueous solution of the conductive composition) is prepared.

As the solvent, an organic solvent or an aqueous solvent can be used. As the organic solvent, for example, ketones such as acetone, methyl ethyl ketone (MEK), or the like; esters such as ethyl acetate; ethers such as propylene glycol monomethyl ether or the like; amides such as N, N-dimethylformamide, or the like may be enumerated. As the aqueous solvent, for example, water; alcohol such as methanol, ethanol, propanol, isopropanol, or the like may be enumerated. Among these, it is favorable to use an aqueous solvent.

An example of the production method of an electrode 10 will be described. After having the conductive composition applies onto a surface of a peeling substrate, by heating the conductive composition, a crosslinking reaction of the binder resin is advanced by the crosslinking agent contained in the conductive composition, to cure the binder resin. In this way, a cured material of the conductive composition is obtained. Thereafter, the surface of the cured material is pressed to have a predetermined shape by using a press machine or the like. In this way, as illustrated in FIG. 3, an electrode 10 is obtained, in which holes 13 having a size and a shape both being substantially uniform are formed to be arranged in a square lattice pattern on the principal surface 11.

As the peeling substrate, a separator, a core material, or the like can be used. As the separator, a resin film such as a polyethylene terephthalate (PET) film, polyethylene (PE) film, polypropylene (PP) film, polyamide (PA) film, polyimide (PI) film, fluororesin film, or the like can be used. As the core material, a resin film such as a PET film or PI film; a ceramic sheet; a metal film such as aluminum foil; a resin substrate reinforced with fiberglass or plastic nonwoven fiber; a silicone substrate or a glass substrate, or the like can be used.

As the method of applying the conductive composition onto the peeling substrate, a method of roll coating, screen coating, gravure coating, spin coating, reverse coating, bar coating, blade coating, air knife coating, dipping, dispensing, or the like; a method of dripping a small amount of the conductive composition onto the substrate, that is then stretched with a doctor blade; or the like can be used. By these application methods, the conductive composition is uniformly applied onto the peeling substrate.

As the method of heating the conductive composition, a publicly known dryer such as a drying oven, a vacuum oven, an air circulation oven, a hot-air dryer, a far-infrared dryer, a microwave decompression dryer, a high-frequency dryer, or the like can be used.

As the heating condition, any condition can be adopted as long as the crosslinking agent contained in the aqueous solution of the conductive composition can react.

The heating temperature of the aqueous solution of the conductive composition is set to a temperature at which the reaction of crosslinking agent contained in the aqueous solution of the conductive composition can be advanced. The heating temperature is favorably 100° C. to 200° C., and more favorably 110° C. to 150° C. As long as the heating temperature is within a range of 100° C. to 200° C., the reaction of the crosslinking agent can be advanced readily, and curing of the binder resin can be advanced.

The heating time of the aqueous solution of the conductive composition is favorably 0.5 minutes to 300 minutes, and more favorably 5 minutes to 120 minutes. As long as the heating time is within a range of 0.5 to 300 minutes, the binder resin can be sufficiently cured.

As described above, the electrode 10 is a sheet-like electrode having the principal surfaces 11 and 12, has multiple holes 13, and has an opening ratio of the holes 13 on the principal surfaces 11 and 12 set to 8% to 80%. This configuration enables, when the pressure-sensitive adhesive layer 110 is formed as the adhesive layer on the principal surface 11 side, the electrode 10 to suppress reduction of the adhesive strength required for being connected with the skin 200 as a biological surface to which the pressure-sensitive adhesive layer 110 contacts as an affixed part through the holes 13 in the electrode 10. Therefore, when the pressure-sensitive adhesive layer 110 is formed on the principal surface 11 side, the electrode 10 can suppress occurrence of peeling of the pressure-sensitive adhesive layer 110 from the skin 200. The electrode 10 can have a peeling adhesive strength of, for example, greater than or equal to 0.010N/10 mm.

The peeling adhesive strength is determined, for example, by a method compliant with JIS Z 0237:2009, or a modified method of JIS Z 0237:2009 in which the specified test plate is changed to another object to be affixed. As the peeling adhesive strength, for example, a peeling strength obtained in the case of conducting a peeling test in which the electrode 10 is adhered to a test plate or an object to be affixed, and then, peeled off at a peeling angle of 180 degrees and at a tensile speed of 300 mm/min can be used. The peeling adhesive strength is favorably within a range of 0.010 N/10 mm to 0.8 N/10 mm, and more favorably within a range of 0.080 N/10 mm to 0.55 N/10 mm. If the peeling adhesive strength is less than 0.010 N/10 mm, in the case of using the electrode 10 affixed to the pressure-sensitive adhesive layer 110, the adhesive strength of the pressure-sensitive adhesive layer 110 to the skin 200 is low, and there is a likelihood that the affixation is not sufficient. If the peeling adhesive strength exceeds 0.8 N/10 mm, the adhesive strength of the pressure-sensitive adhesive layer 110 is high; therefore, there is a likelihood that re-adhesion or the like of the pressure-sensitive adhesive layer 110 is hindered.

Also, by setting the opening ratio of the holes 13 on the principal surfaces 11 and 12 to 2% to 80%, a sufficient area can be secured for the electrode 10 to have the principal surface 11 or the principal surface 12 contact the skin 200. Therefore, the electrode 10 can stably maintain the electrical conductivity with the skin 200.

Therefore, when the pressure-sensitive adhesive layer 110 is formed on the principal surface 11 side, the electrode 10 can suppress peeling of the pressure-sensitive adhesive layer 110 from the skin 200, and simultaneously, can hold the electrical conductivity. Therefore, when the electrode 10 is used in a biosensor, measurement can be executed while suppressing peeling of the electrode 10 from the skin for a long period of time.

In the electrode 10, the number of holes 13 can be less than or equal to 2,000 holes/cm$^2$. With a number as such, when the adhesive layer is formed on the electrode 10, a sufficient number of regions of the adhesive layer exposed from the holes 13 of the electrode 10 can be secured, and the contact area of the electrode 10 to the skin 200 can be maintained. Therefore, when the pressure-sensitive adhesive layer 110 is formed on the principal surface 11 side, the electrode 10 can further suppress occurrence of peeling of the pressure-sensitive adhesive layer 110 from the skin 200, and simultaneously, can secure the electrical conductivity.

The electrode 10 can be configured to have the holes 13 arranged in a square lattice pattern on the principal surfaces 11 and 12. With this arrangement, when the adhesive layer is formed on the electrode 10, the adhesive layer can contact the skin 200 substantially equally around the entire perimeter of the electrode 10 through the holes 13 in the electrode 10, and the contact area of the electrode 10 to the skin 200 can be secured substantially evenly. Therefore, when the adhesive layer is formed on the principal surface 11 side, even if stretching or contraction occurs in any direction of the skin 200, the adhesive layer can stably maintain the adhesive strength to the skin 200, and the electrode 10 can stably maintain the electrical conduction with the skin 200.

In the electrode 10, the holes 13 can be formed to penetrate through the principal surfaces 11 and 12 perpendicularly. This enables, when the pressure-sensitive adhesive layer 110 is formed on the electrode 10, the pressure-sensitive adhesive layer 110 to easily pass through the holes 13. Therefore, the pressure-sensitive adhesive layer 110 can easily contact the skin 200 from the holes 13; therefore, the electrode 10 can stably maintain the connection between the pressure-sensitive adhesive layer 110 and the skin 200. Also, the effect of the viscosity and the like of the pressure-sensitive adhesive layer 110 can be reduced; therefore, an optimum adhesive layer can be used depending on the type of the skin 200.

As illustrated in FIGS. 1 and 2, the probe 140 is fixed to the frame 132 by a fixing tape 145 that covers edge parts along the four sides, in a state of the edge parts along the four sides being arranged on the frame 132. The fixing tape 145 is adhered to the frame 132 through gaps such as the holes 140A in the probe 140.

The fixing tape 145 is, as an example, a copper tape, and has a rectangular loop shape in plan view. The fixing tape 145 has its bottom surface coated with an adhesive. The fixing tape 145 is provided on the frame 132 so as to surround the four sides of the probe 140 on the outside of the opening of the through holes 113 and 123 in plan view, to fix the probe 140 to the frame 132. The fixing tape 145 may be a tape of metal other than copper.

In a state of the probe 140 having its edge parts along the four sides fixed on the frame 132 by the fixing tape 145 in this way, the pressure-sensitive adhesive layer 110A and the base material layer 120A are overlaid on the fixing tape 145 and the probe 140. When the pressure-sensitive adhesive layer 110A and the base material layer 120A are pressed downward, the probe 140 is pushed along the inner walls of the through holes 113 and 123, and the pressure-sensitive adhesive layer 110A is pushed into the interior of the holes 140A in the probe 140.

The probe 140 is pushed down to a position at which its center part becomes substantially flush with the bottom surface 112 of the pressure-sensitive adhesive layer 110, in a state of its edge parts along the four sides being fixed on the frame 132 by the fixing tape 145. Therefore, if having the probe 140 come in contact with the skin 200 of the living body (see FIG. 2), the pressure-sensitive adhesive layer 110A can be adhered to the skin 200, and the probe 140 can be firmly adhered to the skin 200.

It is favorable that the thickness of the probe 140 is thinner than the thickness of the pressure-sensitive adhesive layer 110. The thickness of the probe 140 is favorably within a range of 0.1 μm to 100 μm, and more favorably within a range of 1 μm to 50 μm, similar to the thickness of the electrode 10 described above.

Also, the surrounding part (rectangular loop-shaped part) surrounding the central part of the pressure-sensitive adhesive layer 110A in plan view is positioned above the fixing tape 145. In FIG. 2, although the top surface of the pressure-sensitive adhesive layer 110A is generally flat, the center part may be recessed downward compared to the surrounding part. The base material layer 120A is overlaid on the generally flat top surface of the pressure-sensitive adhesive layer 110A.

The pressure-sensitive adhesive layer 110A and the base material layer 120A as such may be made of the same materials as the pressure-sensitive adhesive layer 110 and the base material layer 120, respectively. Also, the pressure-sensitive adhesive layer 110A may be made of a material different from that of the pressure-sensitive adhesive layer 110. Also, the base material layer 120A may be made of a material different from that of the base material layer 120.

Note that in FIG. 2, although the thicknesses of the respective parts are exaggerated, in practice, the thicknesses of the pressure-sensitive adhesive layer 110 and 110A is within a range of 10 μm to 300 μm, and the thicknesses of the base material layer 120 and 120A is within a range of 1 μm to 300 μm. Also, the thicknesses of the wire 131 is within a range of 0.1 μm to 100 μm, the thicknesses of the substrate 133 is around several 100 μm, and the thicknesses of the fixing tape 145 is within a range of 10 μm to 300 μm.

Also, as illustrated in FIG. 2, in the case where the probe 140 directly contacts the frame 132, and the electrical connection is secured, the fixing tape 145 may be a tape made of resin or the like that does not have electrical conductivity.

Also, in FIG. 2, the fixing tape 145 covers the side surfaces of the frame 132 and the substrate 133 in addition to the probe 140, and reaches the top surface of the base material layer 120. However, the fixing tape 145 simply needs to have the probe 140 and the frame 132 joined, and hence, does not need to reach the top surface of the base material layer 120; does not need cover the side surfaces of the substrate 133; and does not need cover the side surfaces of the frame 132.

Also, the substrate 133 and the two substrates 135 may be one integrated substrate. In this case, the wires 131, the two frames 132, and the terminal 135A are provided on a surface of the one substrate, to have the electronic device 150 and the battery 160 mounted.

The electronic device 150 is formed on the top surface 122 of the base material layer 120, and electrically connected to the wires 131. The electronic device 150 has a rectangular shape in cross sectional view. The bottom surface (in the −Z direction) of the electronic device 150 is provided with terminals. As the material of the terminals of the electronic device 150, solder, conductive paste, or the like may be enumerated.

As illustrated in FIG. 1, the electronic device 150 includes, as an example, an application specific integrated circuit (ASIC) 150A, a micro processing unit (MPU) 150B, a memory 150C, and a wireless communication unit 150D; and is connected to the probes 140 via the circuit parts 130 and the battery 160. The electronic device 150 processes biological signals obtained through the probes 140.

The ASIC 150A includes an A/D (Analog to Digital) converter. The electronic device 150 is driven by electric power supplied from the battery 160, to obtain biological signals measured by the probes 140. The electronic device 150 executes processing such as filtering and digital conversion on the biological signals, and the MPU 150B calculates an arithmetic mean of values of the biological signals obtained multiple times, to store the mean in the memory 150C. The electronic device 150 can obtain biological signals continuously, as an example, for 24 hours or longer. In some cases, the electronic device 150 measures biological signals for a long period of time; therefore, various ideas are incorporated to reduce the electric power consumption.

The wireless communication unit 150D is a transceiver used when a test device of an evaluation test reads biological signals stored in the memory 150C during the evaluation test via the wireless communication, and executes communication, as an example, at 2.4 GHz. The evaluation test is a test, as an example, compliant with the standard of JIS 60601-2-47. The evaluation test is a test executed after completion of a biosensor, to verify operations of the biosensor to detect biological signals as a medical device. The evaluation test requires an attenuation factor of a biological signal extracted from the biosensor being less than 5% with respect to a biological signal input into the biosensor. This evaluation test is to be executed for all completed products.

As illustrated in FIG. 2, the battery 160 is provided on the top surface 122 of the base material layer 120. As the battery 160, a lead battery, a lithium ion secondary battery, or the like can be used. The battery 160 may be a button battery. The battery 160 is an example of a battery. The battery 160 has terminals provided on its bottom surface. The terminals of the battery 160 are connected to the probes 140 via the circuit parts 130, and the electronic device 150. The capacity of the battery 160 is set so that the electronic device 150 can measure biological signals, as an example, for 24 hours or longer.

The cover 170 covers the base material layer 120, the circuit parts 130, the substrate 135, the probes 140, the fixing tapes 145, the electronic device 150, and the battery 160. The cover 170 has a base part 170A and a protruding part 170B protruding in the +Z direction from the center of the base part 170A. The base part 170A is a part positioned at the periphery of the cover 170 in plan view, and is a part positioned lower than protruding part 170B. A recessed part 170C is provided below the protruding part 170B. In the cover 170, the bottom surface of the base part 170A is adhered to the top surface 122 of the base material layer 120. In the recessed part 170C, the substrate 135, the electronic device 150, and the battery 160 are housed. The cover 170 is bonded to the top surface 122 of the base material layer 120 in a state of having the electronic device 150, the battery 160, and the like housed in the recessed part 170C.

In addition to the role of serving as a cover for protecting the circuit parts 130, the electronic device 150, and the battery 160 on the base material layer 120, the cover 170 has a role of serving as a shock absorbing layer to protect the interior components from shocks applied to the patch-type biosensor 100 from the top surface side. As the cover 170, for example, silicone rubber, soft resin, urethane, or the like can be used.

Figure 5:
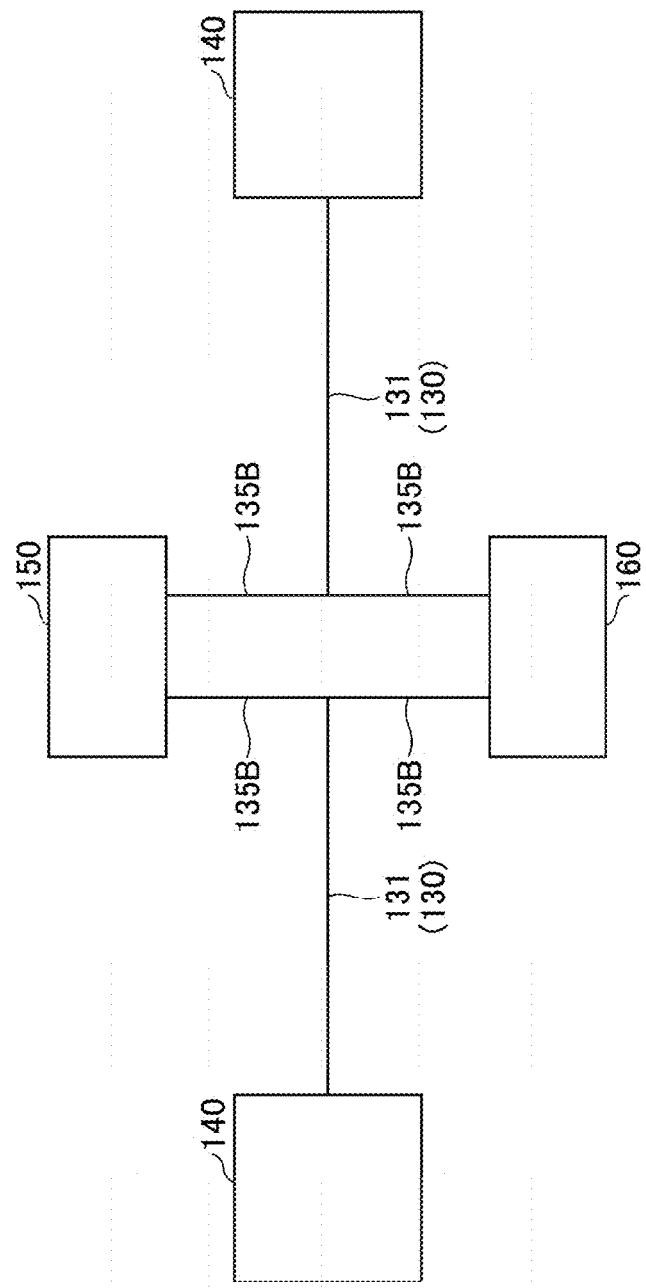
FIG. 5 is a diagram illustrating a circuit configuration of a patch-type biosensor.

FIG. 5 is a diagram illustrating a circuit configuration of the patch-type biosensor 100. Each of the probes 140 is connected to the electronic device 150 and the battery 160 via the wire 131 and the wire 135B of the substrate 135. The two probes 140 are connected in parallel to the electronic device 150 and the battery 160.

In this way, the patch-type biosensor 100 is provided with the probes 140 each having the connecting surface 141 connected to the frame 132 of the circuit part 130, on the side (in the −Z axis direction) to be affixed to the surface of the skin 200. By connecting the probe 140 to the frame 132 through the connection surface 141, the probe 140 can be less likely to be peeled off from the frame 132. This enables the patch-type biosensor 100 to make the connection between the probe 140 and the frame 132 stable; therefore, the conduction between the probe 140 and the frame 132 can be secured stably. Also, the patch-type biosensor 100 has the probe 140 arranged on the side of the pressure-sensitive adhesive layer 110 (in the −Z axis direction) to be affixed to the surface of the skin 200, to be capable of contacting the surface of the skin 200; therefore, the conduction with the skin 200 can be held stably. Therefore, the patch-type biosensor 100 can suppress peeling of the pressure-sensitive adhesive layer 110 formed on one side of the probe 140 from the skin 200 on which the probe 140 is placed, and simultaneously, can hold the electrical conductivity. Therefore, the patch-type biosensor 100 can stably measure biological information even when the patch-type biosensor 100 is affixed to a skin and used for a long period of time.

The patch-type biosensor 100 has one or more holes 140A in the connecting surface 141 of the probe 140, and can have the circuit part 130 connected to the probe 140 on a side (in the +Z axis direction) opposite to the side (in the −Z axis direction) to be affixed to the surface of the skin 200. By having the holes 140A in the connecting surface 141, the probe 140 can have the pressure-sensitive adhesive layer 110A, that is exposed from the holes 140A formed in the connecting surface 141, contact the top surface of the frame 132 of the circuit part 130 (a surface in the +Z axis direction). This enables the probe 140 to be held in a state of being connected to the frame 132 by the pressure-sensitive adhesive layer 110A. Therefore, the patch-type biosensor 100 can have the probe 140 and the frame 132 to be more stably connected by the pressure-sensitive adhesive layer 110A exposed through the holes 140A formed in the connecting surface 141.

The patch-type biosensor 100 is provided with the probe 140 formed using the electrode 10 described above (see FIG. 3), and the probe 140 can have an opening ratio of 8% to 80%. This enables the patch-type biosensor 100 to suppress reduction in the adhesive strength to the skin 200 contacted by the pressure-sensitive adhesive layer 110 through the holes 140A in the probe 140, and hence, to suppress the probe 140 from being peeled off from the skin 200. Also, the patch-type biosensor 100 can secure the electrical conductivity in the probe 140; therefore, the conduction with the skin 200 can be held stably. Therefore, the patch-type biosensor 100 can more stably suppress peeling of the pressure-sensitive adhesive layer 110 formed on one side of the probe 140 from the skin 200 on which the probe 140 is placed, and simultaneously, can hold the electrical conductivity. Therefore, as for the patch-type biosensor 100, even when the patch-type biosensor 100 affixed to a skin and used for a long period of time, the patch-type biosensor 100 can stably measure biological information.

In the patch-type biosensor 100, the number of holes 140A in the probe 140 can be less than or equal to 300 holes/cm$^2$. This can further suppress occurrence of peeling of the pressure-sensitive adhesive layer 110 passing through the holes 140A in the probe 140 from the skin 200, and can secure the electrical conductivity. Therefore, the patch-type biosensor 100 can be used stably in a state of being affixed to the skin 200 for a long period of time.

The patch-type biosensor 100 can be configured to have the holes 140A in the probe 140 arranged in a square lattice pattern on the principal surface. This enables the pressure-sensitive adhesive layer 110 to contact the skin 200 substantially equally around the entire perimeter of the probe 140 through the holes 140A, and the contact area of the probe 140 to the skin 200 can be secured substantially evenly. Therefore, even if the surface of the skin 200 moves, and the skin 200 contacting the probe 140 stretches or contracts in any direction, the patch-type biosensor 100 can have the pressure-sensitive adhesive layer 110 stably maintain a state of being affixed to the skin 200 through the holes 140A of the probe 140.

The patch-type biosensor 100 can have the holes 140A in the probe 140 penetrate through the principal surfaces of the probe 140 perpendicularly. This enables the patch-type biosensor 100 to have the pressure-sensitive adhesive layer 110 easily contact the skin 200 through the holes 140A in the probe 140; therefore, a connection between the pressure-sensitive adhesive layer 110 and the skin 200 can be easily formed.

After being used for measuring biometric information, the patch-type biosensor 100 can be recovered as necessary to remove the electronic device 150 and the battery 160, and by replacing these components, can be reused.

The patch-type biosensor 100 is a measurement device that senses electrical signals from a living body to measure biological information, and can be used as a patch-type electrocardiogram, patch-type electroencephalograph, patch-type blood pressure manometer, patch-type pulse meter, patch-type myometer, patch-type thermometer, patch-type accelerometer, or the like.

Among these applications, the patch-type biosensor 100 is favorably used as a patch-type electrocardiogram. In electrocardiography, by having the patch-type biosensor 100 obtain as biological information minute action potentials (electromotive forces) of the myocardium that occur with the heartbeat of a test subject, abnormal electrocardiograms such as arrhythmias and ischemic heart disease can be investigated. In electrocardiography, the patch-type biosensor 100 being affixed to the chest, both wrists, both ankles, or the like of a test subject can stably detect, as electrical signals, myocardial active potentials generated by the heartbeat of the test subject by the probes 140. By using the electrical signals detected by the probes 140, the patch-type biosensor 100 can obtain electrocardiogram waveforms more precisely.

(Other Forms of Biosensor)

Figure 6:
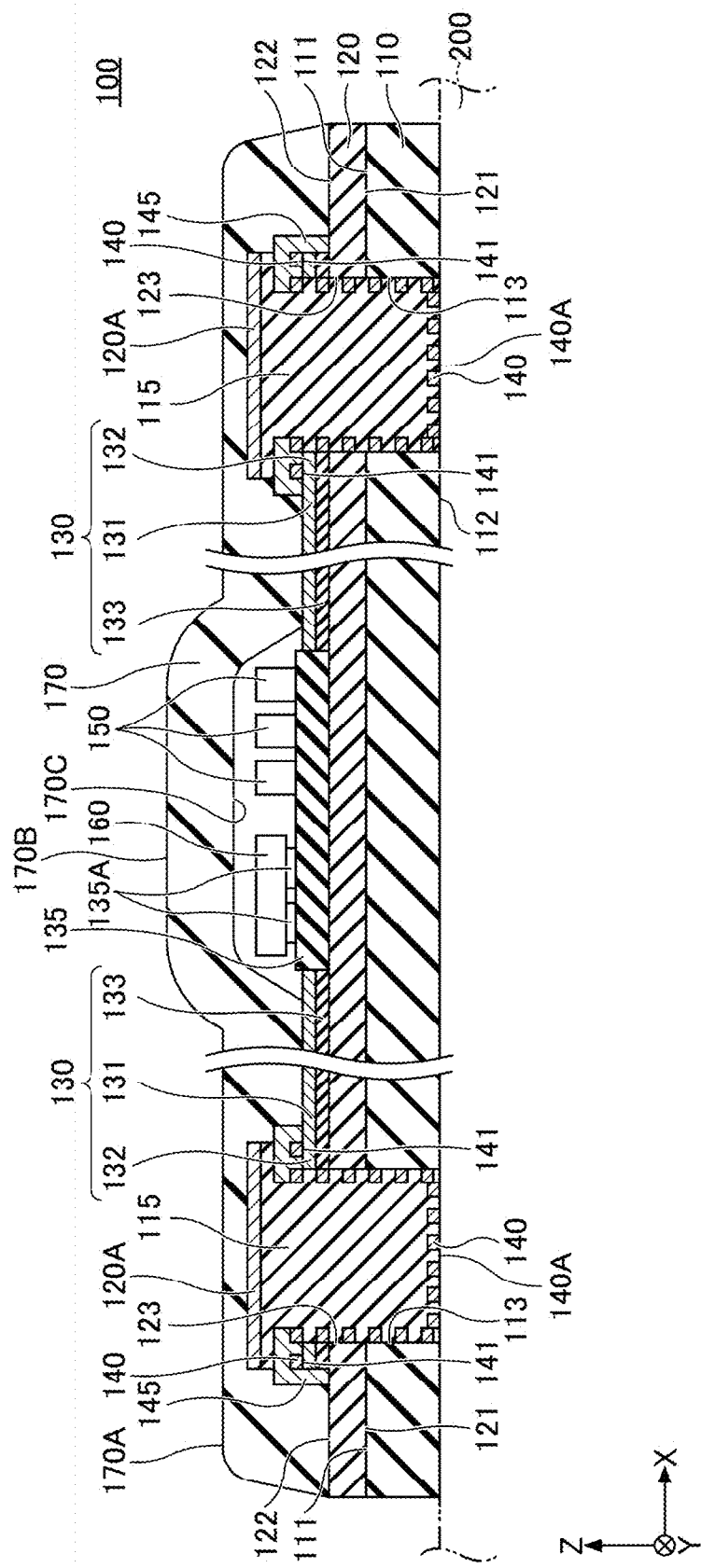
FIG. 6 is a cross sectional view illustrating one example of another form of a patch-type biosensor in a completed state corresponding the cross section viewed in the direction of arrows A-A in FIG. 1.

As illustrated in FIG. 6, the patch-type biosensor 100 may include a moisture barrier layer 115 in the through holes 113 and 123 instead of the pressure-sensitive adhesive layer 110A.

The moisture barrier layer 115 has a function of suppressing moisture present around the probe 140 from penetrating through the patch-type biosensor 100 in the thickness direction. The moisture barrier layer 115 forms the bottom surface of the patch-type biosensor 100, together with the pressure-sensitive adhesive layer 110. By having the moisture barrier layer 115 provided around the bottom surface of the probe 140, moisture around the probe 140 can be suppressed from penetrating through the patch-type biosensor 100 in the thickness direction; therefore, when having the probe 140 come in contact with the skin 200 of a living body, the moisture between the bottom surface of the probe 140 and the skin 200 can be maintained at the interface. Also, by having the moisture between the bottom surface of the probe 140 and the skin 200 maintained at the interface, drying of the probe 140 can be suppressed; therefore, the increase and variation in impedance of the probe 140 due to drying of the surface of the probe 140, can be suppressed.

The moisture permeability of the moisture barrier layer 115 is lower than that of the pressure-sensitive adhesive layer 110 and the base material layer 120. Specifically, the moisture permeability of the moisture barrier layer 115 is, for example, less than 1,000 $g/m^2$ per day, favorably less than or equal to 600 $g/m^2$ per day, more favorably less than or equal to 300 $g/m^2$ per day, even more favorably less than or equal to 80 $g/m^2$ per day, and, for example, greater than or equal to 0.001 $g/m^2$ per day.

As the material of the moisture barrier layer 115, for example, a rubber-based resin (polyisobutylene-based resin, butyl rubber-based resin, SBR-based resin, natural rubber/SBR-based resin, or the like), polystyrene-based resin, polyolefin-based resin (polypropylene-based resin, polyethylene-based resin layer), acryl-based resin, polyvinyl alcohol-based resin, or the like may be enumerated. Any of these resins may be used alone, or two or more may be used in combination.

The moisture barrier layer 115 may include air bubbles. As the moisture barrier layer 115, foam of a polypropylene-based resin, acryl-based resin, or the like can be used.

It is favorable that the moisture barrier layer 115 has pressure-sensitive adhesiveness. As the moisture barrier layer having such pressure-sensitive adhesiveness, favorably, a rubber-based resin layer (rubber-based pressure-sensitive adhesive layer), and more favorably, a polyisobutylene-based resin layer (polyisobutylene-based pressure-sensitive adhesive layer) may be enumerated.

The polyisobutylene-based resin layer is formed of a polyisobutylene-based composition. The polyisobutylene-based composition contains polyisobutylene as a rubber component. The content of polyisobutylene in the polyisobutylene-based composition is, for example, favorably 10 mass % to 50 mass %, and more favorably 20 mass % to 40 mass %.

It is favorable that the polyisobutylene-based composition contains a high water absorption resin and a tackifier. This enables a rubber-based composition such as the polyisobutylene-based composition to have an excellent moisture barrier property and pressure-sensitive adhesiveness.

As the high water absorption resin, for example, a maleic anhydride-based resin (e.g., crosslinked sodium salt of a copolymer of isobutylene and maleic anhydride), polyacrylate-based resin, polysulfonate-based resin, polyacrylamide-based resin, polyvinyl alcohol-based resin, or the like may be enumerated, and favorably, a maleic anhydride-based resin or the like may be recommended. The content of the high water absorption resin is, with respect to 100 parts by mass of polyisobutylene, for example, favorably 1 part by mass to 10 parts by mass, and more favorably 3 parts by mass to 5 part by mass.

As the tackifier, for example, a rosin-based resin, terpene-based resin (e.g., terpene-aromatic-based liquid resin), coumarone-indene-based resin, phenol-based resin, phenolic-formalin-based resin, xylene-formalin-based resin, petroleum-based resin (e.g., C5-based petroleum resin, C9-based petroleum resin, C5/C9-based petroleum resin, etc.), or the like may be enumerated, and favorably, a petroleum-based resin may be recommended. The content of the tackifier is, with respect to 100 parts by mass of polyisobutylene, for example, favorably 10 parts by mass to 200 parts by mass, and more favorably 50 parts by mass to 150 parts by mass.

The polyisobutylene-based composition can further contain a softening agent, a bulking agent, a crosslinking agent, and the like, as necessary.

As the softening agent, for example, liquid rubber such as polybutene, liquid isoprene rubber, or liquid butadiene rubber; oils such as paraffin-based oil, naphthene-based oil, and the like; esters such as phthalate ester and phosphateester may be enumerated, and favorably, liquid rubber may be recommended. The content of the softening agent is, with respect to 100 parts by mass of polyisobutylene, favorably 10 parts by mass to 200 parts by mass, and more favorably 50 parts by mass to 150 parts by mass.

As the bulking agent, for example, calcium carbonate such as heavy calcium carbonate, light calcium carbonate, white luster, or the like; carbon black, talc, mica, clay, mica flour, bentonite, silica, alumina, aluminum silicate, titanium oxide, glass flour, boron nitride flour; metal powders such as aluminum powder and iron powder; resin powders such as acrylic powder and styrenic powder; metal hydroxides such as aluminum hydroxide and magnesium hydroxide may be enumerated, and favorably, calcium carbonate may be recommended. The content of the bulking agent is, with respect to 100 parts by mass of polyisobutylene, favorably 10 parts by mass to 200 parts by mass, and more favorably 50 parts by mass to 150 parts by mass.

As the crosslinking agent, for example, an isocyanate-based compound such as hexamethylene diisocyanate, or the like may be enumerated. For example, the content of the crosslinking agent is, with respect to 100 parts by mass of polyisobutylene, favorably 1 part by mass to 10 parts by mass, and more favorably 3 parts by mass to 5 parts by mass.

The polyisobutylene-based composition can contain publicly known additives such as a plasticizing agent, a foaming agent, and the like at any suitable ratios.

As the rubber-based resin layer, from the viewpoint of stability in terms of fixture on a skin, favorably, a styrene-butadiene rubber (SBR)-based resin layer and a natural rubber/SBR-based resin layer may be enumerated, and more favorably, a SBR-based resin layer may be recommended.

The SBR-based resin layer is formed of an SBR-based composition. The SBR-based composition contains SBR as a rubber component. The content of SBR in the SBR-based composition is favorably 10 mass % to 50 mass %, and more favorably 20 mass % to 40 mass %.

The SBR-based composition may also contain a high water absorption resin, a tackifier, a softening agent, a bulking agent, a crosslinking agent, and the like, as contained in the polyisobutylene-based composition.

A natural rubber/SBR-based resin layer is formed of a natural rubber/SBR-based composition. The natural rubber/SBR-based composition contains natural rubber and SBR as the rubber components. The total content of natural rubber and SBR in the natural rubber/SBR-based composition is favorably 10 mass % to 50 mass %, and more favorably 20 mass % to 40 mass %.

The natural rubber/SBR-based composition may also contain a high water absorption resin, a tackifier, a softening agent, a bulking agent, a crosslinking agent, and the like, as contained in the polyisobutylene-based composition.

The thickness of the moisture barrier layer 115 is substantially the same as the thickness of the pressure-sensitive adhesive layer 110. Specifically, the thickness of the moisture barrier layer 115 is favorably within a range of 10 μm to 300 μm, more favorably within a range of 20 μm to 100 μm, and even more favorably within a range of 30 μm to 50 μm.

MODIFIED EXAMPLES

Note that in the present embodiment, the electrode 10 does not need to be provided with holes 13 in its principal surface 11.

In the present embodiment, the holes 13 may be provided with an optimum number depending on the size of the electrode 10 and the like, and the number simply needs to be one or more.

Figure 7:
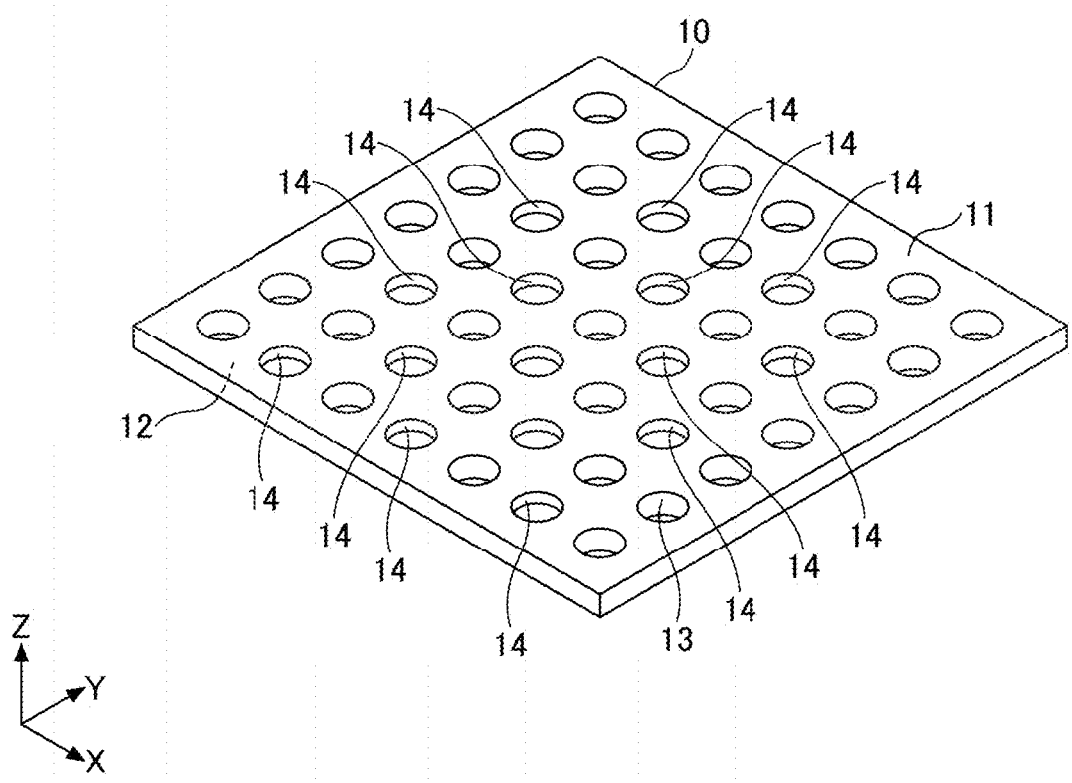
FIG. 7 is a perspective view illustrating an example of another configuration of an electrode.

In the present embodiment, as illustrated in FIG. 7, the electrode 10 may have multiple recessed parts 14 recessed from the principal surface 11 toward the principal surface 12, in addition to the holes 13. This configuration can enlarge the area of the principal surface 12 of the electrode 10 that contacts the skin 200; therefore, the electrode 10 can more stably secure the electrical conductivity with the skin 200.

In the present embodiment, the arrangement of the holes 13 is not limited to be a square lattice pattern, and may be an oblique lattice pattern or a hexagonal (staggered) lattice pattern. Also, the multiple holes 13 may be arranged regularly or irregularly.

Figure 8:
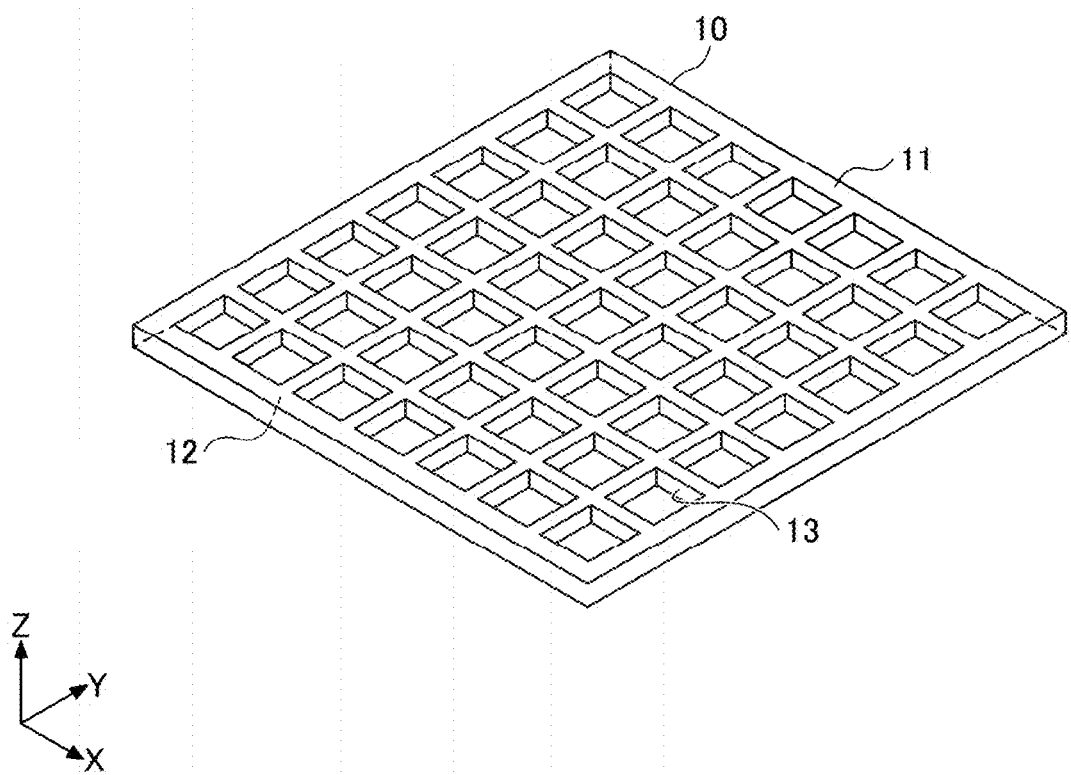
FIG. 8 is a perspective view illustrating an example of another configuration of an electrode.

In the present embodiment, the shape of the hole 13 may be a polygon such as a rectangle in plan view. For example, as illustrated in FIG. 8, the hole 13 may be formed to have a rectangular shape in plan view. The rectangle may be square or oblong. In this case, the length L of each side of the hole 13 is favorably 100 nm to 10 mm, more favorably 300 nm to 5 mm, and even more favorably 600 μm to 2 mm. In the case where the shape of the hole 13 is rectangular, it is favorable that the long side has a dimension of a numerical value as described above.

In the present embodiment, the shapes and dimensions of the respective holes 13 may not be uniform necessarily.

In the present embodiment, although the through holes 113 and 123 of the patch-type biosensor 100 are formed to have a rectangular shape in plan view, these may be formed to have another shape such as a circle.

In the present embodiment, the patch-type biosensor 100 does not need to be provided with the electronic device 150, the battery 160, or the cover 170.

In the present embodiment, the patch-type biosensor 100 may be provided with a peeling sheet formed of a resin such as polyethylene terephthalate, on the bottom surfaces of the pressure-sensitive adhesive layer 110, the pressure-sensitive adhesive layer 110A, and the probes 140.

EXAMPLES

In the following, the embodiment will be described in further detail with reference to Examples and Comparative examples; note that the embodiment is not limited by these Examples and Comparative examples.

Examples 1

Example 1-1

(Production of Conductive Composition)

As a conductive polymer, 38.0 parts by mass of an aqueous solution containing PEDOT/PSS (PEDOT/PSS by a concentration of 1%, "Clevious PH 1000", manufactured by Heleus); as a binder resin, 10.0 parts by mass of an aqueous solution containing modified polyvinyl alcohol (modified polyvinyl alcohol by a concentration of 10%, "GOSENX Z-410", manufactured by Nippon Synthetic Chemical Co., Ltd.); as a crosslinking agent, 2.0 parts by mass of an aqueous solution containing a zirconium-based compound (a zirconium-based compound by a concentration of 10%, "Safelink SPM-01", manufactured by Nippon Synthetic Chemical Co., Ltd.); as a plasticizing agent, 2.0 parts by mass of glycerin (Wako Pure Chemical Corp.); and as a surfactant, 0.08 parts by mass of a silicone-based surfactant (Silface SAG002, manufactured by Nissin Chemical Co., Ltd.) are added to an ultrasonic bath. Then, the aqueous solution containing these components was mixed in the ultrasonic bath for 30 minutes, to prepare a uniform aqueous solution of the conductive composition.

The concentration of PEDOT/PSS in the aqueous solution containing PEDOT/PSS was approximately 1%; therefore, the content of PEDOT/PSS in the aqueous solution of the conductive composition became 0.38 parts by mass. The concentration of modified polyvinyl alcohol in the aqueous solution containing modified polyvinyl alcohol was approximately 10%; therefore, the content of modified polyvinyl alcohol in the aqueous solution of the conductive composition became 1.00 parts by mass. The concentration of the zirconium-based compound in the aqueous solution containing the zirconium-based compound was approximately 10%; therefore, the content of the zirconium-based compound in the aqueous solution of the conductive composition became 0.20 parts by mass. Note that the remaining parts were the solvent in the aqueous solution of the conductive composition.

The contents of the conductive polymer, the binder resin, the crosslinking agent, the plasticizing agent, and the surfactant with respect to 100 parts by mass of the conductive composition were 10.4 parts by mass, 27.3 parts by mass, 5.5 parts by mass, 54.6 parts by mass, and 2.2 parts by mass, respectively.

(Production of Electrode)

After having applied the prepared aqueous solution of the conductive composition onto the PET film (3 cm×3 cm), the conductive composition aqueous solution was heated and dried at 120° C. for 10 minutes, to produce a cured material of the conductive composition (1 cm long by 1 cm wide, and 10 μm thick). Thereafter, the cured material in a state of closely adhering to a peeling sheet (a PET film) was pressed by a pressing machine. In this way, on the peeling sheet, a probe sheet having an electrode in which multiple holes were formed to be circular and arranged in a square lattice pattern on the principal surface (a hole diameter of 300 μm, and an opening ratio of 30%), was produced.

(Evaluation of Peeling Resistance)

A moisture barrier layer to be attached to the electrode and an object to be affixed when evaluating the peeling resistance of the electrode, were prepared.

(1) Preparation of Moisture Barrier Layer

An SBR-based resin (product name "SLY-25", manufactured by Nitto Denko Corporation) was diluted with a toluene solvent so as to have a ratio of the SBR-based resin to the toluene solvent become 10:1, to prepare a mixed solution. The mixed solution was applied onto the surface of a second peeling sheet (a PET film), and then, heated and dried. In this way, a moisture barrier layer sheet having pressure-sensitive adhesiveness was obtained. The shape of the moisture barrier layer was generally rectangular (1 cm by 1 cm, and 25 μm thick) in plan view.

(2) Preparation of Object to be Affixed

A pig skin (skin set of Yucatan micropig (YMP), manufactured by CHARLES RIVER LABORATORIES JAPAN, INC.) frozen and stored at −80° C. was thawed at room temperature, and preprocessed to remove subcutaneous fat. Thereafter, the preprocessed pig skin was cut to 30 mm×50 mm×5 mm. The cut pig skin was used as the object to be affixed.

(3) Measurement of Peeling Adhesive Strength

Figure 9:
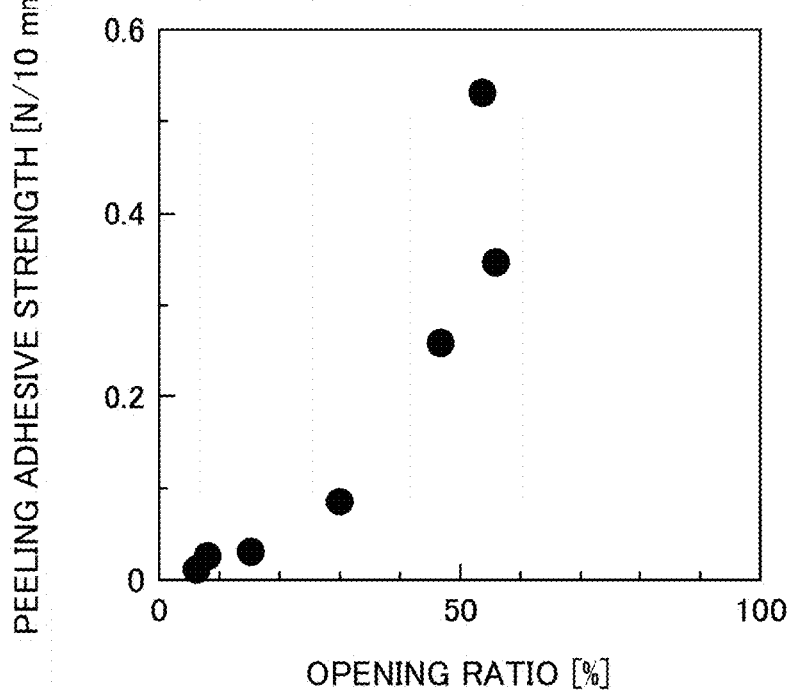
FIG. 9 is a diagram illustrating a relationship between the opening ratio and the peeling adhesive strength.

The moisture barrier layer prepared as described above was formed on one of the principal surfaces of the produced electrode, to produce a test specimen. Thereafter, the principal surface on which the electrode as the test specimen was exposed was affixed to the object to be affixed, to which pressure joining was applied by one reciprocation motion of a 2-kg roller. Thereafter, the test specimen was held at 23° C. for 5 minutes under reference atmosphere of 50% RH. Thereafter, under the reference atmosphere, by using a table-top precision universal test machine ("Autograph AGS-50NX", manufactured by Shimadzu Corporation), under conditions of a peeling angle of 180 degrees, and a tensile speed of 100 mm/min, a 180-degree peeling test was conducted for the specimen, and the 180-degree peeling adhesive strength (in unit of N/10 mm) of the specimen was measured with respect to the object to be affixed. Measurements were made three times (N=3), and a mean of these measurements was taken as the peeling adhesive strength (initial peeling strength). The measurement results are shown in FIG. 9. Also, in the case where the peeling adhesive strength at room temperature obtained in the above test was greater than or equal to 0.010 mN/10 mm, the result was evaluated as good (in Table 1, denoted as A). In the case where the peeling adhesive strength was less than 0.010 N/10 mm or exceeding 0.8 N/10 mm, the result was evaluated as poor (in Table 1, denoted as B). The measurement results of peeling adhesive strength and the evaluation results are shown in Table 1.

Example 1-2

In contrast to Example 1-1, the interval between the holes of the electrode was changed to 600 μm, and the opening ratio was changed to 14.9%; other than these, the production and measurements were performed in substantially the same way as in Example 1-1.

Example 1-3

In contrast to Example 1-1, the interval between the holes of the electrode was changed to 900 μm, and the opening ratio was changed to 8.1%; other than these, the production and measurements were performed in substantially the same way as in Example 1-1.

Example 1-4

In contrast to Example 1-1, the hole diameter of the electrode was changed to 600 μm, and the opening ratio was changed to 46.8%; other than these, the production and measurements were performed in substantially the same way as in Example 1-1.

Example 1-5

In contrast to Example 1-1, the hole diameter of the electrode was changed to 900 μm, and the opening ratio was changed to 55.9%; other than these, the production and measurements were performed in substantially the same way as in Example 1-1.

Example 1-6

In contrast to Example 1-1, the hole diameter of the electrode was changed to 1200 μm, and the opening ratio was changed to 53.9%; other than these, the production and measurements were performed in substantially the same way as in Example 1-1.

Example 1-7

In contrast to Example 1-1, the interval between the holes of the electrode was changed to 1200 μm, and the opening ratio was changed to 6.1%; other than these, the production and measurements were performed in substantially the same way as in Example 1-1.

Comparative Example 1-1

In contrast to Example 1-1, the interval between the holes of the electrode was changed to 2,000 μm, and the opening ratio was changed to 1.2%; other than these, the production and measurements were performed in substantially the same way as in Example 1-1.

Table 1 shows the shape of the holes, the hole diameter, the interval between the holes, the opening ratio, and the peeling adhesive strength in each of Examples and Comparative example.

TABLE 1

| | Electrode | | | | |
|---|---|---|---|---|---|
| | | | | Peeling adhesive strength | |
| | Shape of hole | Hole diameter [μm] | Interval between holes [μm] | Opening ratio [%] | Value [N/10 mm] | Evaluation |
| Ex. 1-1 | Circular | 300 | 300 | 30.0 | 0.082 | A |
| Ex. 1-2 | Circular | 600 | 300 | 14.9 | 0.030 | A |
| Ex. 1-3 | Circular | 300 | 900 | 8.1 | 0.026 | A |
| Ex. 1-4 | Circular | 600 | 300 | 46.8 | 0.254 | A |
| Ex. 1-5 | Circular | 900 | 300 | 55.9 | 0.342 | A |
| Ex. 1-6 | Circular | 1200 | 300 | 53.9 | 0.528 | A |
| Ex. 1-7 | Circular | 300 | 1200 | 6.1 | 0.012 | A |
| Comp. ex. 1-1 | Circular | 300 | 2000 | 1.2 | 0.000 | B |

As shown in FIG. 9 and Table 1, in Examples 1-1 to 1-7, the opening ratio was greater than or equal to 6.1%, and the peeling adhesive strength was greater than or equal to 0.012 N/10 mm. In contrast, in Comparative example 1-1, the opening ratio was 1.2%, and the peeling adhesive strength was 0.000 N/10 mm.

Therefore, when the opening ratio of the electrode is within a range of 6% to 56%, it was confirmed that the peeling adhesive strength of the electrode could be greater than or equal to 0.012 N/10 mm, and the electrode had high adhesiveness. Therefore, in the biosensor according to an embodiment, the electrode has an opening ratio within a predetermined range; therefore, when used as the electrode of the biosensor, the electrode can have stable adhesive strength, and can have electrical conductivity. Therefore, it can be stated that the biosensor can be effectively used for measuring electrocardiograms continuously for a long period of time (e.g., 24 hours) while being closely adhered to a skin of a test subject.

Examples 2

Example 2-1

(Production of Electrode)

The electrode produced in Example 1-1 was used. The number of holes per unit area of the electrode was 261 holes/cm$^2$.

(Evaluation of Peeling Resistance)

Figure 10:
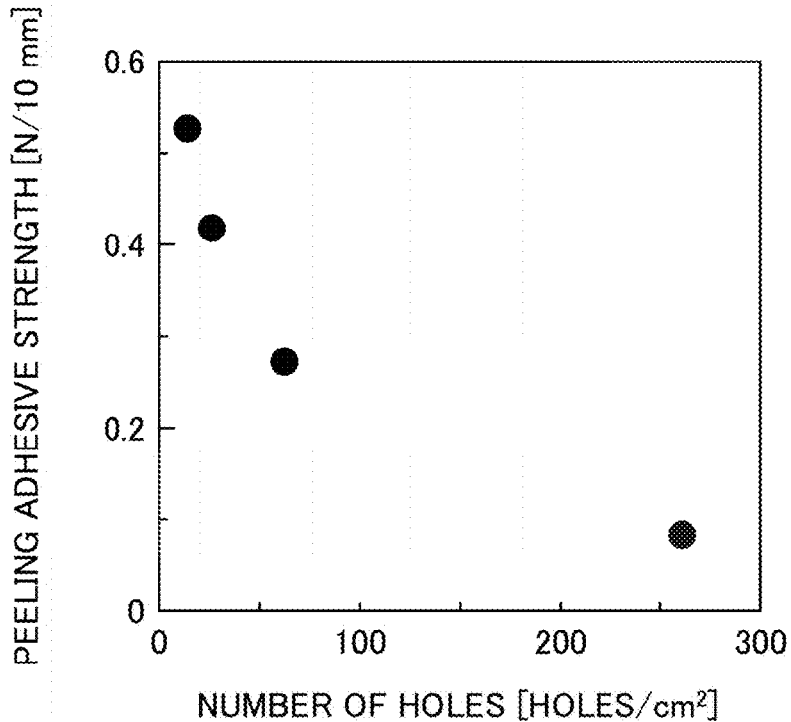
FIG. 10 is a diagram illustrating a relationship between the number of holes and the peeling adhesive strength.

The peeling adhesive strength was measured and evaluated in substantially the same way as in Example 1-1. The measurement results are shown in FIG. 10. Also, as in Example 1-1, the peeling adhesive strength at room temperature obtained by the test described above was evaluated. The measurement results of peeling adhesive strength and the evaluation results are shown in Table 2.

(Evaluation of Stretching Rate Upon Breaking)

Figure 11:
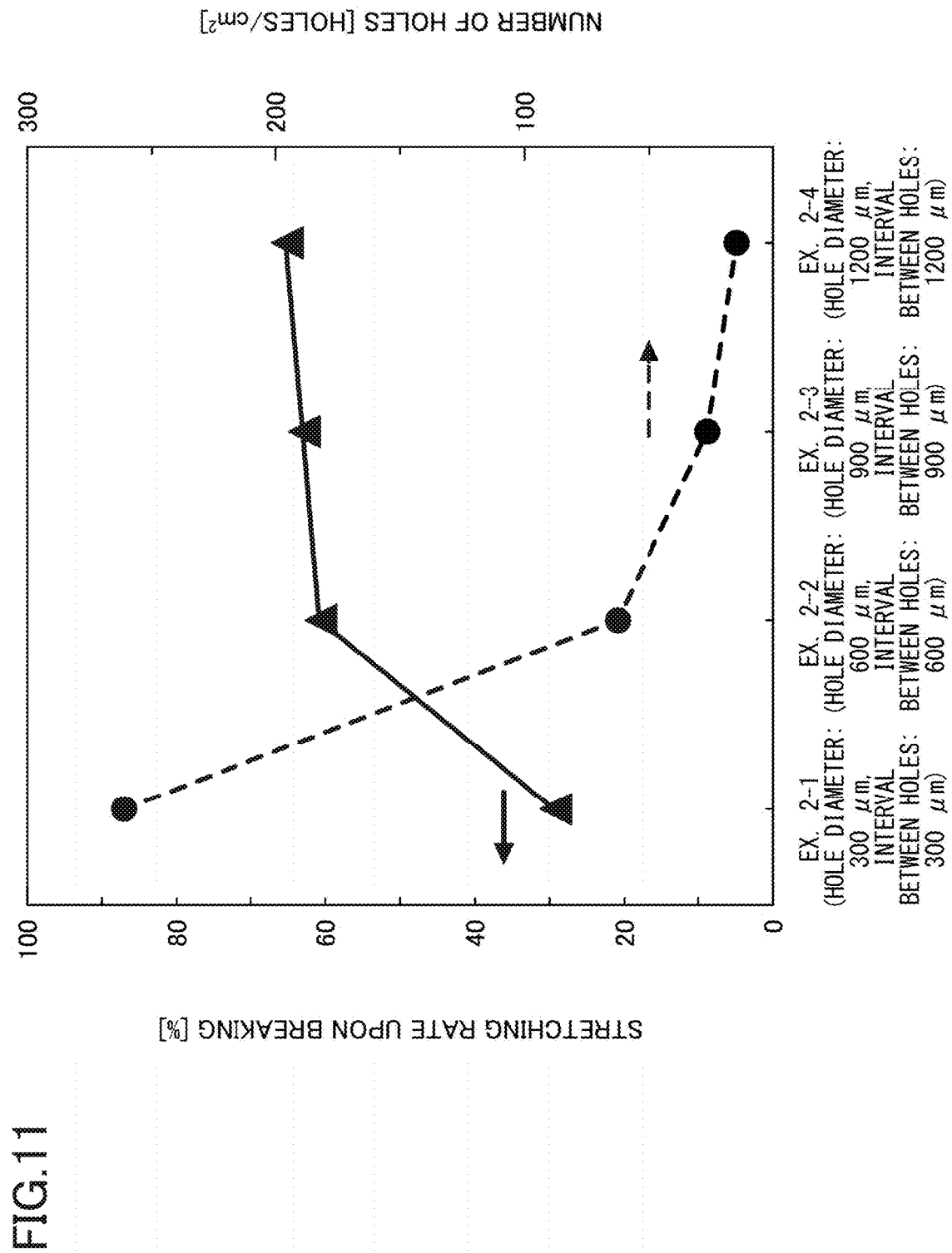
FIG. 11 is a diagram illustrating a relationship between the number of holes and the stretching rate upon breaking in Examples 2-1 to 2-4.

The stretching rate upon breaking was measured while the 180-degree peeling test of the test specimen was performed. The results of the measurement of the stretching rate upon breaking are illustrated in FIG. 11. Table 2 shows the results of measurements of the stretching rate upon breaking.

Example 2-2

In Example 2-1, the hole diameter and the interval between holes of the electrode were changed to 600 μm, and the number of holes per unit area of the electrode was changed to 61 holes/cm$^2$; other than these, the production and measurements were performed in substantially the same way as in Example 2-1.

Example 2-3

In Example 2-1, the hole diameter and the interval between holes of the electrode were changed to 900 μm, and the number of holes per unit area of the electrode was changed to 26 holes/cm$^2$; other than these, the production and measurements were performed in substantially the same way as in Example 2-1.

Example 2-4

In Example 2-1, the hole diameter and the interval between holes of the electrode were changed to 1,200 μm, and the number of holes per unit area of the electrode was changed to 14 holes/cm$^2$; other than these, the production and measurements were performed in substantially the same way as in Example 2-1.

Comparative Example 2-1

In Example 2-1, the hole diameter and the interval between holes of the electrode were changed to 100 μm, and the number of holes per unit area of the electrode was changed to 2,500 holes/cm$^2$; other than these, the production and measurements were performed in substantially the same way as in Example 2-1.

Table 2 shows the shape of the holes, the hole diameter, the interval between the holes, the number of holes per unit area, the peeling adhesive strength, and the stretching rate upon breaking in each of Examples and Comparative example.

TABLE 2

|  | Electrode | | | | | |
| --- | --- | --- | --- | --- | --- | --- |
|  | Shape of hole | Hole diameter [μm] | Interval between holes [μm] | Number of holes per unit area [holes/cm$^2$] | Peeling adhesive strength | | Stretching rate upon breaking [%] |
|  |  |  |  |  | Value [N/10 mm] | Evaluation |  |
| Ex. 2-1 | Circular | 300 | 300 | 261 | 0.082 | A | 88 |
| Ex. 2-2 | Circular | 600 | 600 | 61 | 0.272 | A | 20 |
| Ex. 2-3 | Circular | 900 | 900 | 26 | 0.418 | A | 10 |
| Ex. 2-4 | Circular | 1200 | 1200 | 14 | 0.526 | A | 5 |
| Comp. ex. 2-1 | Circular | 100 | 100 | 2500 | 0.000 | B | 97.5 |

As shown in FIG. 10 and Table 2, in Examples 2-1 to 2-4, the number of holes per unit area was greater than or equal to 14 holes, and the peeling adhesive strength was greater than or equal to 0.082N/10 mm. In contrast, as shown in Table 2, in Comparative example 2-1, the number of holes per unit area was 2,500 holes/cm$^2$, and the peeling adhesive strength was 0.000 N/10 mm.

Also, as shown in FIG. 11 and Table 2, in Examples 2-1 to 2-4, even if the peeling adhesive strength was greater than or equal to 0.082 N/10 mm, the stretching rate upon breaking was greater than or equal to 5%.

Therefore, as long as the number of holes per unit area of the electrode is less than or equal to 261, it was confirmed that the peeling adhesive strength of the electrode could be greater than or equal to 0.082 N/10 mm, and the electrode had high adhesiveness. Also, it was confirmed that the electrode can have a stretch rate upon breaking of greater than or equal to 5%.

Therefore, the electrode has the number of holes per unit area being less than the predetermined value, and the stretching rate upon breaking of greater than or equal to the predetermined value; therefore, when the electrode is used as a probe of a biosensor, peeling of the adhesive layer formed on one surface of the probe from a biological surface on which the probe is mounted can be suppressed, and simultaneously, the electrical conductivity can be held. Therefore, the biosensor can have a stable adhesive strength, and can have electrical conductivity; therefore, it can be stated that the biosensor can be effectively used for measuring electrocardiograms continuously for a long period of time (e.g., 24 hours) while being closely adhered to a skin of a test subject.

As above, the embodiments have been described; note that the embodiments are presented by way of example, and the present invention is not limited by the embodiments described above. The embodiments can be implemented in a variety of other forms, and can be combined, omitted, substituted, and altered in various ways within a scope not deviating from the gist of the present invention. These embodiments and variations thereof are included in the scope and gist of the present invention, and included in the scope of the present invention described in the claims and in equivalents thereof.

DESCRIPTION OF REFERENCE CODES 10 electrode
11,12 principal surface
13,140A hole
100 patch-type biosensor (biosensor)
110 pressure-sensitive adhesive layer
120 base material layer
130 circuit part
140 probe
141 connecting surface
150 electronic device
160 battery
170 cover

The invention claimed is:

1. A biosensor comprising:
   a pressure-sensitive adhesive layer to be affixed to a biological surface;
   an electrode arranged to be capable of contacting the biological surface on a side of the pressure-sensitive adhesive layer to be affixed to the biological surface;
   an electronic device configured to process a biological signal obtained via the electrode; and
   a circuit part connecting the electrode and the electronic device, wherein
   the electrode has a connecting surface connected to the circuit part on a side affixed to the biological surface, and
   the electrode is formed to have a plate shape having a pair of principal surfaces parallel to each other, and the electrode has one or more holes penetrating through the electrode in a direction perpendicular to at least one principal surface of the pair of principal surfaces,
   wherein the pressure-sensitive adhesive layer is in direct contact with the circuit part via the one or more holes.

2. The biosensor as claimed in claim 1, wherein at least one hole of the one or more holes penetrating through the electrode is through the connecting surface, and
   wherein the circuit part is connected to the electrode on a side opposite to the side affixed to the biological surface.

3. The biosensor as claimed in claim 1, wherein the electrode contains a conductive polymer and a binder resin,
   wherein the one or more holes comprises a plurality of holes, and
   wherein an opening ratio of the plurality of holes on each principal surface of the pair of principal surfaces is 2% to 80%.

4. The biosensor as claimed in claim 1, wherein a number of the one or more holes is less than or equal to 2,000 holes/cm$^2$.

5. The biosensor as claimed in claim 1, wherein the one or more holes comprises a plurality of holes arranged in a square lattice pattern, an oblique lattice pattern, or a hexagonal lattice pattern, on the principal surfaces of the pair of principal surfaces.

6. The biosensor as claimed in claim 1, wherein the one or more holes comprises a plurality of holes penetrating through the principal surfaces of the pair of principal surfaces perpendicularly.

7. The biosensor as claimed in claim 1, wherein a recessed part is included on at least one principal surface of the pair of principal surfaces.

* * * * *